United States Patent
Bitra et al.

(10) Patent No.: US 10,542,518 B2
(45) Date of Patent: Jan. 21, 2020

(54) MOBILE ACCESS POINT DETECTION

(71) Applicant: QUALCOMM Incorporated, San Diego, CA (US)

(72) Inventors: Suresh Kumar Bitra, Mangalagiri (IN); Sai Pradeep Venkatraman, Santa Clara, CA (US); Manohar Kandagadla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/481,422

(22) Filed: Apr. 6, 2017

(65) Prior Publication Data

US 2018/0295599 A1 Oct. 11, 2018

(51) Int. Cl.
| | | |
|---|---|---|
| H04W 64/00 | (2009.01) | |
| H04W 48/16 | (2009.01) | |
| H04W 24/08 | (2009.01) | |
| G01S 5/10 | (2006.01) | |
| G01S 5/02 | (2010.01) | |
| G01S 5/00 | (2006.01) | |

(52) U.S. Cl.
CPC ........... *H04W 64/003* (2013.01); *G01S 5/021* (2013.01); *G01S 5/10* (2013.01); *H04W 24/08* (2013.01); *H04W 48/16* (2013.01); *H04W 64/00* (2013.01); *G01S 5/0063* (2013.01); *G01S 5/0252* (2013.01)

(58) Field of Classification Search
CPC ..... H04W 64/00; H04W 64/03; H04W 64/04; H04W 4/23
USPC ........................................... 455/456.1–456.6
See application file for complete search history.

(56) References Cited

U.S. PATENT DOCUMENTS

| | | | |
|---|---|---|---|
| 2011/0238286 A1 | 9/2011 | Roesser | |
| 2011/0287779 A1* | 11/2011 | Harper | .................... G01S 19/03 |
| | | | 455/456.1 |
| 2013/0188508 A1* | 7/2013 | Cho | ......................... G01S 5/04 |
| | | | 370/252 |
| 2013/0237246 A1 | 9/2013 | Aggarwal et al. | |
| 2014/0036701 A1 | 2/2014 | Gao et al. | |
| 2014/0206379 A1 | 7/2014 | Mayor et al. | |

(Continued)

OTHER PUBLICATIONS

International Search Report and Written Opinion—PCT/US2018/022763—ISA/EPO —dated May 23, 2018.

*Primary Examiner* — Joshua L Schwartz
(74) *Attorney, Agent, or Firm* — Silicon Valley Patent Group LLP

(57) ABSTRACT

Measurements from a plurality of Access Points (APs) may be used to determine that at least one AP in the plurality is mobile. Measurements from APs determined to be mobile may be excluded when determining a User Equipment (UE) location. Disclosed embodiments also pertain to AP mobility characterization. AP mobility may be determined based on range rate measurements such as Round Trip Time measurements between the AP and UE; or a Doppler frequency shift relative to a nominal frequency used by the AP for transmissions. Based on range rate measurements, a probability of mobility may be assigned to APs. Information pertaining to APs that are determined to be stationary or associated with a low probability of mobility may be reported to a location server. Information pertaining to APs determined to be mobile or associated with a higher probability of mobility may not be reported to a location server.

22 Claims, 11 Drawing Sheets

(56) References Cited

U.S. PATENT DOCUMENTS

| | | |
|---|---|---|
| 2015/0094100 A1 | 4/2015 | Opshaug et al. |
| 2015/0112543 A1* | 4/2015 | Binion .................. G07C 5/085 |
| | | 701/32.2 |
| 2015/0237641 A1 | 8/2015 | Sahu et al. |
| 2016/0131733 A1 | 5/2016 | Do et al. |
| 2016/0198429 A1 | 7/2016 | Prechner et al. |
| 2016/0205238 A1* | 7/2016 | Abramson ......... G01C 21/3484 |
| | | 455/456.4 |
| 2017/0006614 A1 | 1/2017 | Reddy et al. |

* cited by examiner

525 

527
Determine, based on the speed and direction of motion of UE, a speed and direction of motion for AP $AP_i$ 210-$i$ based on measured Doppler frequency values for first frequency band $F_1$

529
Estimate, based on the speed and direction of motion of AP $AP_i$ 210-$i$ relative to UE 100, an expected Doppler frequency value for second frequency band $F_2$

531
Determine, based the speed and direction of motion of AP $AP_i$ 210-$i$ relative to UE 100, a speed and direction of motion for AP $AP_i$ 210-$i$ based on measured Doppler frequency values for second frequency band $F_2$

535
Determine a corresponding probability $p_{AP_i}$ that AP $AP_i$ 210-$i$ is mobile based on one or more of: (a) expected Doppler frequencies, or (b) Doppler frequency measurements for AP $AP_i$ 210-$i$ at frequency bands $F_1$ and $F_2$.

RETURN

FIG. 5B

MOBILE ACCESS POINT DETECTION

FIELD

The subject matter disclosed herein relates to location determination and specifically, to location determination in an environment that includes mobile and/or self-aware wireless access points.

BACKGROUND

It is often desirable to perform positioning functions on user equipment (UE) such as a mobile terminal, a cellular phone or other mobile device. The terms "location" and "position" are synonymous and are used interchangeably herein.

Conventionally, some location determination techniques may use known or predetermined locations of Access Points (APs) and/or Base Stations (collectively referred to as APs herein) to determine the position of a UE. However, when APs are mobile (e.g. the position or location of the AP changes over some time period), UE locations that are determined using conventional location determination techniques based on the known locations of APs using may be unreliable and/or inaccurate.

Detection of access points that are mobile may facilitate more accurate and/or reliable location determination for UEs.

SUMMARY

In some embodiments, a method on a User Equipment (UE) may comprise: obtaining measurements from a plurality of APs; determining, based on the measurements, that at least one AP of the plurality of APs is mobile; and determining a location of the UE based upon a subset of the measurements from the plurality of APs, wherein the subset excludes measurements from the at least one AP determined to be mobile.

In another aspect, a User Equipment (UE) may comprise: a memory; a transceiver; and a processor coupled to the memory and the transceiver, wherein the processor is configured to: obtain, via the transceiver, measurements from a plurality of APs; determine, based on the measurements, that at least one AP of the plurality of APs is mobile; and determine a location of the UE based upon a subset of the measurements from the plurality of APs, wherein the subset excludes measurements from the at least one AP determined to be mobile.

In a further aspect, a User Equipment (UE) may comprise: means for obtaining measurements from a plurality of APs; means for determining, based on the measurements, that at least one AP of the plurality of APs is mobile; and means for determining a location of the UE based upon a subset of the measurements from the plurality of APs, wherein the subset excludes measurements from the at least one AP determined to be mobile.

In some embodiments, a non-transitory computer-readable medium may comprise executable instructions to configure a processor on a User Equipment (UE) to: obtain measurements from a plurality of APs; determine, based on the measurements, that at least one AP of the plurality of APs is mobile; and determine a location of the UE based upon a subset of the measurements from the plurality of APs, wherein the subset excludes measurements from the at least one AP determined to be mobile.

In some embodiments, a method on a User Equipment (UE) for determining Access Point (AP) mobility may comprise: obtaining range rate measurements for one or more APs, wherein each AP of the one or more APs is associated with a corresponding measurement set comprising range rate measurements; and determining, for each AP, based, in part, on the range rate measurements in the corresponding measurement set, a corresponding probability that the AP is mobile.

In another aspect, a User Equipment (UE) may comprise: a memory; a transceiver; and a processor coupled to the memory and the transceiver, wherein the processor is configured to: obtain, via the transceiver, range rate measurements for one or more APs, wherein each AP of the one or more APs is associated with a corresponding measurement set comprising range rate measurements; and determine, for each AP, based, in part, on the range rate measurements in the corresponding measurement set, a corresponding probability that the AP is mobile.

In another aspect, a User Equipment (UE) for determining Access Point (AP) mobility may comprise: means for obtaining range rate measurements for one or more APs, wherein each AP of the one or more APs is associated with a corresponding measurement set comprising range rate measurements; and means for determining, for each AP, based, in part, on the range rate measurements in the corresponding measurement set, a corresponding probability that the AP is mobile.

Disclosed embodiments also pertain to a non-transitory computer-readable medium comprising executable instructions to configure a processor to: obtain, via the transceiver, range rate measurements for one or more APs, wherein each AP of the one or more APs is associated with a corresponding measurement set comprising range rate measurements; and determine, for each AP, based, in part, on the range rate measurements in the corresponding measurement set, a corresponding probability that the AP is mobile.

The methods disclosed may be performed by one or more of: APs, and/or servers (including location servers), UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

FIGS. 5A and 5B show an exemplary method for detection of mobile APs.

DETAILED DESCRIPTION

Figure 1:
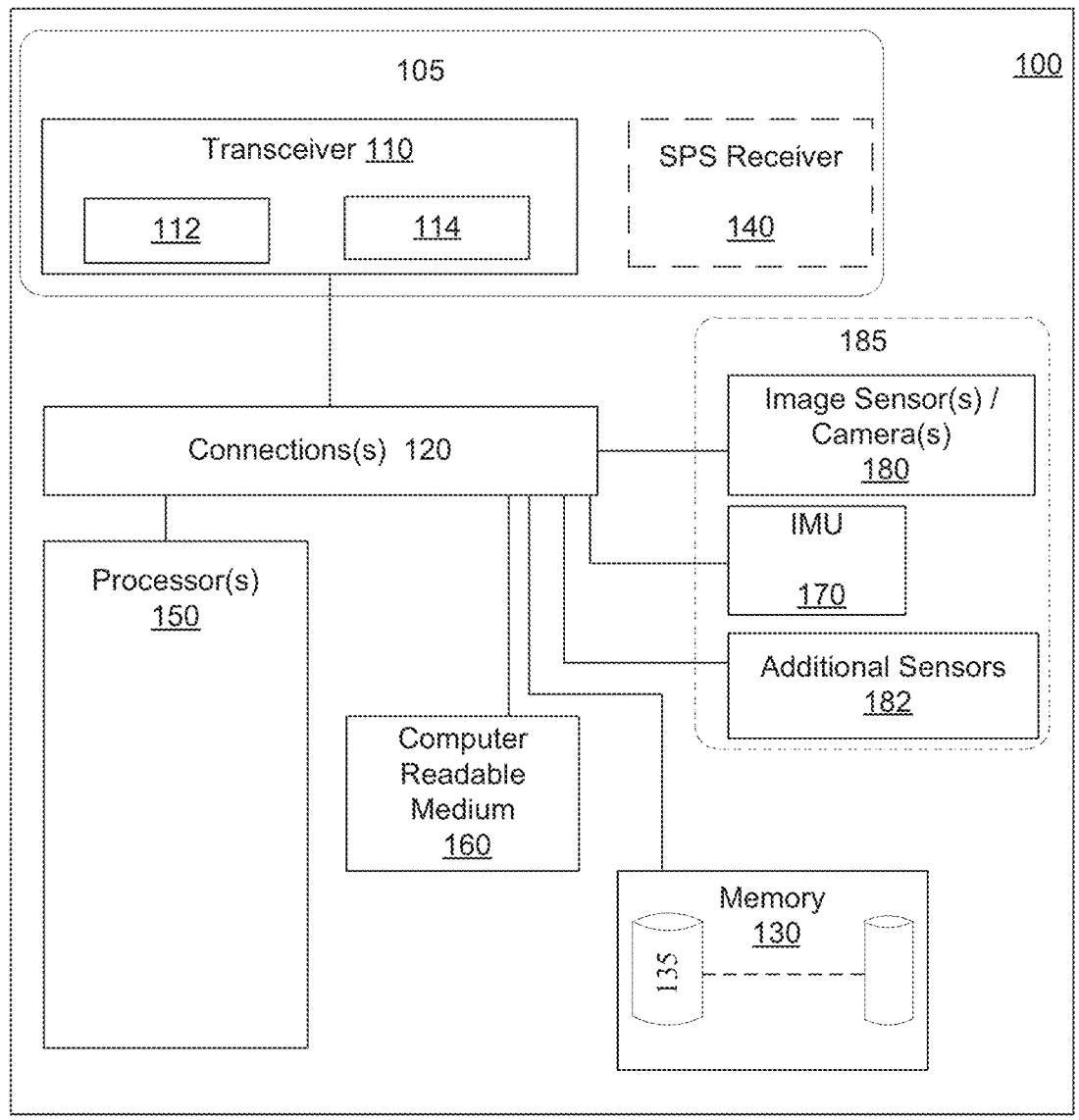
FIG. 1 shows a schematic block diagram illustrating certain exemplary features of a UE.

Embodiments disclosed facilitate positioning related operations, in part, by determining Access Points (APs) that are mobile. A device (e.g. AP or UE) may be considered mobile if it is not stationary. Various techniques such as multi-lateration (e.g. Advanced Forward Link Trilateration), Round Trip Time (RTT) measurements, Time Difference of Arrival (TDOA), Reference Signal Time Difference (RSTD), Received Signal Strength Indication (RSSI) etc. may be used to determine the location of a UE. The above techniques may use the known or determined locations of APs to determine the location of a UE. However, if one or more of the APs used to determine the location of a UE are mobile, then, the accuracy of the determined location of the UE may be detrimentally affected.

In some embodiments, mobility may be determined based on range measurements or range rate measurements. Range measurements refer to two-way propagation delay between two entities, such as a UE and an AP. Range rate measurements refer to the rate of change of distance between two entities such as a UE and an AP. A range rate measurement may be obtained based on the difference between two range measurements. Range rate measurements may indicate whether the distance between the UE and AP is decreasing (the UE and/or AP is moving toward the other), increasing (the UE and/or AP is moving away from the other), or unchanged (no relative change in distance between the AP and UE). In some embodiments, AP mobility may be determined based on one or more of: Round Trip Time (RTT) measurements (e.g. between a UE and the AP); or a Doppler frequency shift associated with transmissions by the AP (e.g. received at a UE). Further, in some embodiments, Received Signal Strength Indicator (RSSI) measurements of AP signals (e.g. measured by a UE) may be used to determine or validate AP mobility (e.g. when AP mobility is determined by an alternate technique).

In some embodiments, when a UE is stationary, range rate measurements may be used to determine and/or validate a motion state of the AP (e.g. mobile or stationary). For example, variations in RTT measurements (e.g. above a first RTT threshold) may be used to determine and/or validate whether an AP is mobile or stationary. As another example, a Doppler frequency shift (e.g. exceeding a first Doppler frequency shift threshold) may be used to determine and/or validate whether an AP is mobile or stationary. In some embodiments, when the UE is stationary, variations in RSSI measurements (e.g. exceeding a first RSSI threshold) may also be used to validate the determination of motion state of the AP (e.g. mobile or stationary).

Conversely, when a UE is mobile, variations in range rate measurements that are not attributable to the UEs motion may be used to determine if an AP is mobile or stationary. For example, when a UE is mobile, the UE may determine parameters associated with the UE's motion state (e.g. speed, direction of travel etc.). Based on parameters associated with the UE's motion, the UE may determine expected range rate values and compare the actual range rate measurements with the expected range rate values. The UE may determine if the AP is mobile or stationary based on the comparison. The expected range rate values may be determined based on parameters associated with the UEs motion and assuming that the AP is stationary. For example, expected RTT values and/or expected values of Doppler frequency shift may be determined based on the UEs motion and assuming that the AP is stationary. The UE may then determine the motion state of an AP based on the extent of variation of the actual range rate measurements (e.g. RTT measurements and/or Doppler frequency measurements) relative to the expected range rate values (e.g. expected values of RTT and/or expected values of Doppler frequency shift).

In general, range rate measurements to determine changes in range or distance between an UE and an AP may be obtained by various techniques (RTT, Doppler frequency shift, RSSI, Time of Flight (ToF) sensors, etc). The range rate measurements may be used to characterize a motion state of the AP (e.g. stationary or mobile). The term "ToF sensor" is used to refer to sensors that determine range using light. For example, structured light, strobes, ToF cameras, Light Detection and Ranging (LIDAR) sensors, etc. may be used perform range rate measurements. ToF sensors may determine range and/or range rate based on the round trip time measurements for light to travel from the UE to an AP and back. In some embodiments, when an AP is determined to be stationary, an identifier associated with the AP and the location of the AP (as determined by the UE) may be reported to a server (e.g. a location server). In some embodiments, reporting of identifying information associated with an AP to a server (e.g. to a location server by a UE) may be considered as an indication of suitability of the AP for location determination purposes. In some embodiments, wireless signal measurements associated with the AP (e.g. RTT measurements) may also be reported to a server (e.g. location server) or another network entity.

In some embodiments, when the motion state of an AP cannot be established with certainty, the AP may be associated with a mobility indication. The mobility indication may include a likelihood of mobility of the AP or a probability that the AP is mobile. The terms "likelihood" and "probability" are used interchangeably herein. In some embodiments, a probability of mobility for an AP may be reported (e.g. by a UE) to a server (e.g. a location server). In some embodiments, based on the likelihoods of mobility received from a plurality of UEs for an AP (e.g. crowdsourced likelihoods of mobility for the AP), the server may: (i) not add the AP to a location determination database; or (ii) remove the AP from location determination databases (if the AP was already in the database); or (iii) adjust a location uncertainty of a UE based on the likelihood of mobility when the AP is used for location determination (e.g. the location uncertainty of the UE may be proportional to an aggregate likelihood of mobility of the AP); or (iv) preclude the use of APs whose corresponding likelihoods of mobility are above some threshold for location determination.

The term "mobility indication" is used to refer to a classification of or categorization of mobility and/or a characterization of the mobility. For example, a mobility indication may indicate that: (i) an AP is mobile; or (ii) an AP is stationary; or (iii) provide a probability (or likelihood) that an AP is mobile. In general, the mobility indication may include any information pertaining to or describing the mobility of an AP. In some embodiments, mobility indication information may further include one or more of: (i) a time at which the mobility indication was determined; (ii) a current location of the UE (when available) or the AP (if available or determinable) at the time of measurement; (iii) the range rate measurements (e.g. RTT based); (iii) information related to mobility of the UE (e.g. whether the UE was mobile or stationary during measurement of AP signals).

In some embodiments, information pertaining to stationary APs or APs likely to be stationary may be reported to a server (e.g. a location server). For example, in some embodiments, the information reported to a server may include AP identification information for APs that are determined to be stationary. In some embodiments, for stationary APs, the information reported to the server may additionally include one or more of corresponding AP location information (if available or determinable), corresponding AP location uncertainty, a corresponding likelihood of AP mobility, etc.

In some embodiments, information pertaining to mobile APs or APs likely to be mobile may not be reported to the server. For example, if the likelihood of mobility for an AP exceeds some threshold, then information pertaining to the AP may not be reported to a server. In some alternative embodiments, information pertaining to mobile APs or APs likely to be mobile may also be reported to a server (e.g. a location server) along with a mobility indication. In some embodiments, the location server may remove APs that are determined to be mobile (e.g. based on the reported likelihood of mobility or an aggregate likelihood of mobility) from location determination databases thereby precluding their use for location determination.

Mobility determination may be used to determine the suitability of an AP for location determination. For example, if an AP is stationary, the location of the AP (when known or determinable) may be used for location determination. As another example, if an AP is determined to be mobile, the AP may not be reported to a location determination entity (e.g. a location server), or if reported, may be removed from location determination databases. As a further example, if the AP is associated with a probability of mobility, then suitability of the AP for location determination may be based on one or more of: (a) the likelihood or probability that the AP is mobile; or (ii) the availability of alternate APs for location determination at a location associated with the AP. For example, in an area with a large number of stationary APs that are available for location determination, a low threshold for likelihood of mobility may be used to determine if an AP should be used for location determination. Accordingly, in an area where a large number of stationary APs are available for location determination, APs with a likelihood of mobility above some threshold may not be used for location determination. Conversely, in an area with few APs, a higher threshold may be used when determining if an AP is to be used for location determination.

In some embodiments, when a UE is coupled to a Vehicle-to Vehicle (V2V) communication system (e.g. using IEEE 802.11p Dedicated Short Range Communications (DSRC)), APs detected over the V2V system (e.g. via 802.11p DSRC) may be assumed to be mobile and may not be reported to a server (e.g. a location server). In some embodiments, wireless measurements for AP mobility determination may be disabled when a UE is communicatively coupled with an AP over a V2V system (e.g. 802.11p DSRC).

The term "transmit" as used herein is used broadly and, unless specified otherwise, may refer to unicast (transmission to a specific device), multicast (transmission to a plurality of devices), and broadcast (a transmission available to all devices within range). The term "Access Point" or "AP" as used herein, may refer to a base station or wireless access point that are used to enable devices to wirelessly connect to a network. The terms "Access Point" or "AP" are also used to refer to devices, which may be referred to as "range extenders", "signal boosters", femtocells, nanocells, or microcells, etc., and used facilitate network connectivity. The term AP is also used to refer to devices, including mobile devices that are capable of providing wireless network access functionality such as by "tethering" and/or serving as "mobile hotspots." For example, a mobile phone or other UE may serve as a wireless access point or wireless hotspot and provide network access functionality to other devices including UEs. The term AP is also intended to refer to devices that provide network connectivity in an "ad hoc network" such as a wireless ad hoc network and/or a peer-to-peer (P2P) network.

In some embodiments, APs may be mobile. For example, mobile APs may be mounted on terrestrial vehicles, such as cars and trains, or aerial vehicles including airplanes (e.g. drones and/or remotely controlled aerial vehicles), balloons, nautical vehicles, buoys, etc and may be used to provide or enhance wireless network connectivity over some area. In some instances, aerial or mobile APs may be used to provide or enhance network coverage for special events where network connectivity and/or network bandwidth may be limited or unavailable. As another example, APs are increasingly available in many public transport vehicles including buses, trains, and airplanes. Disclosed embodiments facilitate determination of mobile APs based, in part, on range rate measurements.

The terms "user equipment" (UE) or "mobile station" (MS), may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

FIG. 1 shows a schematic block diagram illustrating certain exemplary features of UE 100. UE 100 may take the form of mobile station, cellular phone, or a computing device such as a wearable device, laptop, handheld, tablet etc, or another entity coupled to a wireless network.

UE 100 may include one or more processing units or processor(s) 150 and memory 130. Processor(s) 150 may be implemented using a combination of hardware, firmware, and software. In some embodiments, UE 100 may include a wireless interface 105, which may comprise transceiver 110 and optional Satellite Positioning (SPS) receiver 140. UE 100 may further comprise one or more sensor bank 185, memory 130, and computer-readable medium 160. Functional components on UE 100 may be operatively coupled to each other with one or more connections 120 (e.g. buses, lines, fibers, links, etc.). In certain example implementations, all or part of UE 100 may take the form of a chipset, and/or the like.

The elements and methodologies described herein may be implemented by various means depending upon the application. For example, these elements and methodologies may be implemented in hardware, firmware, software, or any combination thereof. In some embodiments, for a hardware implementation, processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The techniques disclosed may also be implemented using hardware (e.g. using functionality provided by an ASIC in processor(s) 150), software running on processor(s) 150, and/or firmware or stored in memory 130, or some combination thereof. For example, processor(s) 150 may process wireless signal measurements (e.g. received over wireless interface 105 from transceiver 110 and/or SPS receiver 140), and/or input from sensor bank 185 (e.g. IMU 170, camera(s) 180, and/or additional sensors 182) to determine a location of UE 100 and/or other parameters related to the movement of UE 100 (e.g. speed and/or direction of travel).

In some embodiments, wireless interface 105 may include transceiver 110, which may comprise transmitter 112 and receiver 114. Transceiver 110 may, for example, include a transmitter 112 enabled to transmit one or more signals over one or more types of wireless communication networks and a receiver 114 to receive one or more signals transmitted over one or more types of wireless communication networks. For example, transceiver 110 may be capable of receiving and/or transmitting: Wireless Wide Area Network (WWAN) (e.g. cellular network) signals and/or Wireless Local Area Network (WLAN) signal (e.g. based on the IEEE 802.11x standard) and/or Wireless Personal Area Network (WPAN) signals (e.g. based on the IEEE 802.15 standard). In some embodiments, transceiver 110 may support reception and transmission on multiple frequencies. For example, transceiver 110 (and UE 100) may support transmission and reception of signals on multiple frequencies (e.g. 2.4 GHz and 5.0 GHz).

In some embodiments, UE 100/receiver 114 may receive wireless signals from one or more APs 210. In some embodiments, the wireless signals received by UE 100 may include an identifier. The identifier may include one or more of: a Medium Access Control (MAC) address, Basic Service Set Identification (BSSID), Service Set Identification (SSID), a Base Station identifier, or another network identifier that may be associated with an AP transmitting the wireless signals. For example, the wireless signals may be received by UE 100 from an AP (e.g. a base station) over a WWAN (e.g. a cellular network) and/or from an AP (e.g. a wireless router) over a WLAN (e.g. based on the IEEE 802.11x standard). In some embodiments, UE 100 may also serve as an access point. For example, UE may serve as an access point in an ad-hoc network or a P2P network. Thus, in some embodiments, UE 100 may be a client connected to one or more APs, while also simultaneously serving as an access point to other devices. For example, UE 100 may serve as an access point to one or more tethered devices. As another example, UE 100 may be coupled to an AP, which may take the form of another UE.

In some embodiments, transceiver 110/processor(s) 150 may be enabled to perform range rate measurements based on signals received from an AP. For example, transceiver 110 may perform a sequence of RTT measurements or Doppler frequency shift measurements to determine if the AP is stationary or mobile. When RTT measurements are used, transceiver 110/processor(s) 150 may perform a sequence of RTT measurements using one or more of: standardized accurate Fine Timing Measurement (FTM) frames, and/or probe and beacon frame exchanges, and/or Request to Send (RTS)/Clear to Send (CTS) frame exchanges. Transceiver 110 or receiver 114 and processor(s) 150 may also be enabled to perform Doppler frequency shift measurements to determine a frequency shift of signals transmitted by the AP relative to a nominal frequency of transmission. In some embodiments, the measurements may be used to determine a range rate (e.g. change in range over time) for the AP, which may be used to characterize the AP as stationary or mobile.

In some embodiments, based on WWAN/WLAN signals received by transceiver 110, processor(s) 150 may use one or more of: Observed Time Difference Of Arrival (OTDOA), RSTD, multi-lateration, AFLT, hybrid SPS-AFLT techniques, RTT, RSSI, etc. to determine a location of UE 100. For example, in multi-lateration, when the positions of the APs are known (or can be determined), UE 100 may determine its own position based on measurements of wireless signals received from the APs. In OTDOA based positioning, UE 100 may measure time differences in received signals from a plurality of base stations. Based on the known positions of the base stations, the observed time differences may be used to calculate the location of UE 100. In some embodiments, UE 100 may use Positioning Reference Signals (PRS), which are often provided by a base station (BS), to determine position. The measured time difference of arrival of the PRS from a reference cell (e.g. the serving cell) and a neighboring cell is known as the Reference Signal Time Difference (RSTD). Using the RSTD measurements for two (or more usually three) or more neighbor cells, the absolute or relative transmission timing of each cell, and the known position(s) of AP transmitting antennas for the reference and neighboring cells, the position of UE 100 may be determined.

In some embodiments, UE 100 may optionally include and/or be coupled SPS receiver 140. At locations where SPS signals are available, UE 100 may determine its position, speed, direction of travel, etc. using SPS based positioning based on signals received by SPS receiver 140. In some embodiments, optional SPS receiver 140 may be enabled to receive signals associated with one or more SPS resources, which may include Global Navigation Satellite System (GNSS) resources. Received GNSS signals may be used to determine a position and/or velocity (speed and direction of movement) of UE 100. Examples of a GNSS include the Global Positioning System (GPS), Galileo, GLONASS, and Beidou. SPS may also include regional systems such as Quasi-Zenith Satellite System (QZSS) over Japan, Indian Regional Navigational Satellite System (IRNSS) over India, and/or various augmentation systems (e.g. a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. Optional SPS receiver 140 may be enabled to receive signals from one or more of the SPS resources outlined above, which may be used to determine one or more of a position, a speed, and/or a direction of travel of UE 100.

In some embodiments, UE 100 may optionally comprise image sensors such as CCD or CMOS sensors and/or camera(s) 180, which are hereinafter referred to as "camera(s) 180". Camera(s) 180 may convert an optical image into an electronic or digital image and may send captured images to processor(s) 150. Camera(s) 180, which may be still and/or video cameras, may capture a series of 2-Dimensional (2D) still and/or video image frames of an environment and send the captured image frames to processor(s) 150. In some embodiments, for example, when UE 100 is embodied in a wearable device, camera(s) 810 may take the form of a wearable camera, or an external camera, which may be operationally coupled to, but housed separately from, other functional units in UE 100. In some embodiments, camera(s) 180 may include and/or take the form of range imaging cameras or ToF cameras, which may determine distance (e.g. to an AP) by measuring the time-of-flight of a light signal between the camera and the target (e.g. the AP).

In some embodiments, images captured by camera(s) 180 may also be used to determine a position of UE 100 and/or determine that UE 100 is mobile and/or determine parameters related to the mobility of UE 100. In some embodiments, images captured by camera(s) 180 may be used to trigger Vision Based Positioning (VBP). For example, a location of UE 100 may be determined relative to a known landmark in the vicinity of UE 100 based on an images captured by camera(s) 180. UE mobility may be determined based on location changes determined using VBP techniques and/or using Visual Inertial Odometry (VIO). In some embodiments, VIO may also be used to determine a location of UE 100 by determining baseline displacement relative to a known previous location of UE 100. In VIO, features in images may be analyzed to determine a baseline displacement of UE 100 relative to some known position (e.g. obtained using another position determination technique).

In some embodiments, UE 100 may optionally include Inertial Measurement Unit (IMU) 170. IMU 170 may comprise 3 axis accelerometer(s), 3-axis gyroscope(s), and/or magnetometer(s), may provide velocity, orientation, and/or other position related information to processor(s) 150. In some embodiments, the output of IMU 170 may be used by processor(s) 150 to determine a position and orientation of UE 100 and/or determine whether UE 100 is mobile or stationary.

In some embodiments, UE 100 may include various optional additional sensors 182. In some embodiments, additional sensors 182 may optionally include one or more of: a magnetometer, an altimeter, and/or a barometer, which may provide inputs to processor(s) 150 to facilitate position determination including determination of altitude, direction of movement, etc. Additional sensors 182 may optionally include biometric sensors, which may record movement of a body based on biometric information, etc. In some embodiments, additional sensors in sensor bank 182 may optionally include one or more of ultrasonic transducers, rangefinders, and/or depth sensors, which may be used to acquire depth information and/or determine distance. The list of additional sensors 182 above in not exhaustive and UE 100 may include various other sensors that are increasingly being incorporated into mobile devices.

In some embodiments, hybrid methods that use a plurality of the above techniques may be used to determine the position of UE 100 and/or movement related parameters (e.g. speed of UE 100 and a direction of travel). For example, IMU, sensor measurements (e.g. barometer or altimeter), and or VBP may be combined with multi-lateration and/or SPS to determine a location of UE 100 and/or parameters related to the movement of UE 100. In instances where UE 100 serves as an access point, position and/or movement related information may be provided to coupled devices.

In some embodiments, processor(s) 150 may process wireless signals received (e.g. via receiver 114) from an AP to determine if the AP is mobile (e.g. an AP mounted on a moving vehicle). Processor(s) 150 may also determine that UE 100 is stationary based on SPS measurements (e.g. from signal received by SPS receiver 140) and/or input from sensor bank 185 (e.g. IMU 170). When UE 100 is determined to be stationary, range rate measurements (e.g. RTT based) for signals exchanged between UE 100 and an AP may be used to determine movement of the AP. Accordingly, processor(s) 150/UE 100 may infer that the AP is mobile if the range rate measurements (e.g. RTT variation) exceeds a first threshold.

As another example, when UE 100 is determined to be stationary, movement of an AP relative to UE 100 may cause a change in the frequency of waves transmitted by the AP and received at UE 100 (e.g. via transceiver 110/receiver 114). The term "Doppler shift" or "Doppler frequency shift" (or Doppler effect) refers to the observed change in frequency of a wave when there is movement relative to the source of the wave. Since nominal frequencies (e.g. 2.4 GHz or 5 GHZ) of transmission of APs are known, when UE 100 is stationary, any Doppler shift may be attributed to motion of the AP. Accordingly, processor(s) 150/UE 100 may infer that the AP is mobile if the absolute value of the Doppler shift exceeds a second threshold. The direction of movement of the AP relative to the UE (e.g. toward the UE or away from the UE) may also be determined based on the Doppler frequency shift.

As a further example, when an AP and UE 100 support multiple frequencies (e.g. 2.4 GHz and 5.0 GHz), processor(s) 150 may determine AP mobility based on a measured Doppler shift for one band (e.g. 2.4 GHz) and then confirm the determination of mobility based on a measured Doppler shift in another band (e.g. 5.0 GHz). For example, with a multi-band AP, a Doppler frequency $f_{Di}^{M}$ may be measured corresponding to a nominal frequency band $F_i$, where i=1, 2 . . . associated with the AP. When the UE is stationary, based on: (i) an assumption that the AP is moving, (ii) the measured Doppler frequency $f_{Di}^{M}$ corresponding to nominal frequency band $F_i$, the UE may predict a Doppler frequency $f_{Dj}^{P}$ for some frequency band $F_j$ (i≠j). If the measured Doppler frequency $f_{Dj}^{M} \approx f_{Dj}^{P}$, within some margin, then, the UE may infer or confirm that the AP is moving. As outlined above, the estimated relative speed and direction of movement of the AP relative to the UE may be determined based on the measured Doppler frequency.

In some instances, processor(s) 150 may determine that UE 100 is mobile based on SPS measurements and/or input from sensor bank 185 (e.g. IMU 170). When UE 100 is determined to be mobile, then, based on the speed and direction of movement of UE 100, and assuming that the AP is stationary, expected range rate values may be determined. In some embodiments, the direction of UE movement relative to the AP may be determined based on RSSI measurements. For example, a decrease in RSSI values of AP signals over time may be used to infer that the UE is moving away from the AP, while an increase in RSSI values of AP signals over time may be used to infer that UE 100 is moving toward the AP. If the measured range rate based on signals exchanged between UE 100 and the AP differs from the expected range rate by more than some threshold, then AP may be determined to be mobile. On the other hand, if the measured range rate does not differ from the expected range rate by more than the threshold, then AP may be determined to be stationary.

For example, based on the speed and direction of movement of UE 100, and assuming that the AP is stationary, UE 100/processor(s) 150 may predict expected RTT values (or an expected change in RTT values). If the measured RTT (or the measured change in RTT) for signals exchanged between UE 100 and the AP differ from the expected RTT values (or the expected change in RTT values) by more than some threshold, then processor(s) 150/UE 100 may infer that the AP is mobile. Conversely, if the measured RTT (or the measured change in RTT) does not differ from the expected RTT (or the expected change in RTT) by more than the threshold, then the AP may be determined to be stationary.

As another example, when UE 100 is determined to be mobile, then, it may be determined whether UE 100 is moving toward the AP or away from the AP. For example, the direction of movement may be determined from the Doppler frequency shift. As another example, a decrease in RSSI values of AP signals over time may be used to infer that the UE is moving away from the AP, while an increase in RSSI values of AP signals over time may be used to infer that UE 100 is moving toward the AP. In some embodiments, based on the speed and direction of movement of UE 100 (e.g. toward or away from an AP) and assuming that the AP is stationary, a Doppler shift may be predicted relative to a nominal frequency used for signal transmission by the AP. If the absolute value of the observed Doppler shift relative to the nominal frequency exceeds the absolute value of the predicted Doppler shift by more than some threshold, then, processor(s) 150/UE 100 may infer that the AP is mobile.

As a further example, when an AP supports multiple frequencies and UE 100 is moving, then, based on: (i) an assumption that the AP is not moving, (ii) the measured Doppler frequency $f_{Di}^M$ corresponding to nominal frequency band $F_i$, and (iii) the estimated relative speed and direction of movement of UE 100 relative to the AP, a Doppler frequency $f_{Dj}^P$ may be predicted for some frequency band $F_j$ (i≠j) supported by the AP. If the measured Doppler frequency $f_{Di}^M \approx f_{Dj}^P$, within some threshold, $\Delta f$ then, the UE may infer that the AP is stationary. Conversely, if $|f_{Dj}^M - f_{Dj}^P| > \Delta f$, then UE 100 may infer that the AP is moving.

In some embodiments, processor(s) 150 may determine AP mobility based on various types of range rate measurements For example, UE 100/processor(s) 150 may determine AP mobility based on RTT or ToF measurements and then validate the determination of AP mobility based on Doppler frequency shift measurements. As another example, UE 100/processor(s) 150 may determine AP mobility based on Doppler frequency shift measurements and then validate the determination of AP mobility based on RTT or ToF measurements. As a further example, in some embodiments, RSSI measurements for signals transmitted by the AP may be optionally used to confirm that an AP is mobile. For example, if RSSI variations for signals transmitted by an AP exceed some threshold (e.g. when the UE 100 is stationary), then, processor(s) 150 may infer that AP is moving.

In some embodiments, processor(s) 150 may assign a probability that an AP is mobile based on one or more of the above measurements. For example, if movement of AP cannot be predicted with the desired confidence (e.g. based on one or more of RTT, RSSI, and/or Doppler shift measurements), then a probability of mobility $p_{APi}$, $0 \leq p_{APi} \leq 1$, may be assigned to an AP denoted by $AP_i$, where $p_{APi}=0$ may indicate that $AP_i$ is stationary, while $p_{APi}=1$ may indicate that $AP_i$ is mobile.

In some embodiments, APs determined to be stationary ($p_{APi}=0$) or APs where $p_{APi}$ is not more than some threshold may be reported (e.g. via transceiver 110) to a server (e.g. a location server) and/or another network entity. Accordingly, in some embodiments, mobile APs may not be reported by UE 100 to the server and/or may not be added to a location determination database by the server. Because UE location determination often relies on known locations of APs, preventing the addition of mobile APs (whose locations may change) to location determination databases and/or precluding the use of mobile APs for location determination may increase the reliability and accuracy of UE position determination. In some embodiments, UE 100 may not report mobile APs ($p_{APi}=1$) or APs with a high probability of mobility (e.g. where $p_{APi}$ is more than some threshold) to a location server or other network entity. In some embodiments, a mobility indication may be associated with an AP reported by UE 100 to a location server or other network entity.

In some embodiments, when UE 100 is coupled to a Vehicle-to Vehicle (V2V) communication system (e.g. using IEEE 802.11p DSRC), APs detected over the V2V system (e.g. via 802.11p DSRC) may be assumed to be mobile and may not be reported to a server (e.g. a location server). In some embodiments, wireless measurements for AP mobility determination may be disabled when a UE is communicatively coupled with an AP over a V2V system (e.g. 802.11p DSRC).

Memory may be implemented within processor(s) 150 or external to processor(s) 150. In some embodiments, memory 130 may hold program code that facilitates position determination for UE 100 and/or determination of mobility for UE 100 or an AP coupled to UE 100. For example, one or more of wireless signal measurements, measurements by IMU 170, or measurements by sensors 185 may be stored in memory and may be used by program code to determine a location of UE 100 and/or mobility of UE 100 and/or to provide an indication of mobility of UE 100. In some embodiments, memory 130 and/or databases 135 in memory 130 may hold information about APs 210, including mobility indication information for APs 210. In some embodiments, mobility indication information associated with an AP 210-i in memory 130 and/or databases 135 in memory 130 of UE 100 may indicate a probability of mobility of AP 210 and whether information associated with an AP 210 may be used for location determination.

If implemented in firmware and/or software, the functions may be stored as one or more instructions or program code on a computer-readable medium, such as computer-readable medium 160 and/or memory 130. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support UE location determination and/or mobility indication determination.

Memory 130 on UE 100 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to computer-readable medium 160. In some embodiments, computer-readable medium 160 may be a part of memory 130. As such, in certain example implementations, the methods and/or apparatuses presented herein may take the form in whole or part of a computer-readable medium 160 that may include computer implementable instructions stored thereon, which when executed by at least one processor(s) 150 may be operatively enabled to perform all or portions of the example operations as described herein.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable medium 160, instructions and/or data may be provided as signals on transmission media included in a communication apparatus. For example, a communication apparatus may include a transceiver 110, which may receive signals through receiver 114 indicative of instructions and data. The instructions and data may cause one or more processors to implement SPS/AFLT/hybrid-AFLT/RSTD/OTDOA measurement and positioning, and/or other functions outlined herein. That is, the communication apparatus includes transmission media with signals indicative of information to perform disclosed functions.

Figure 2:
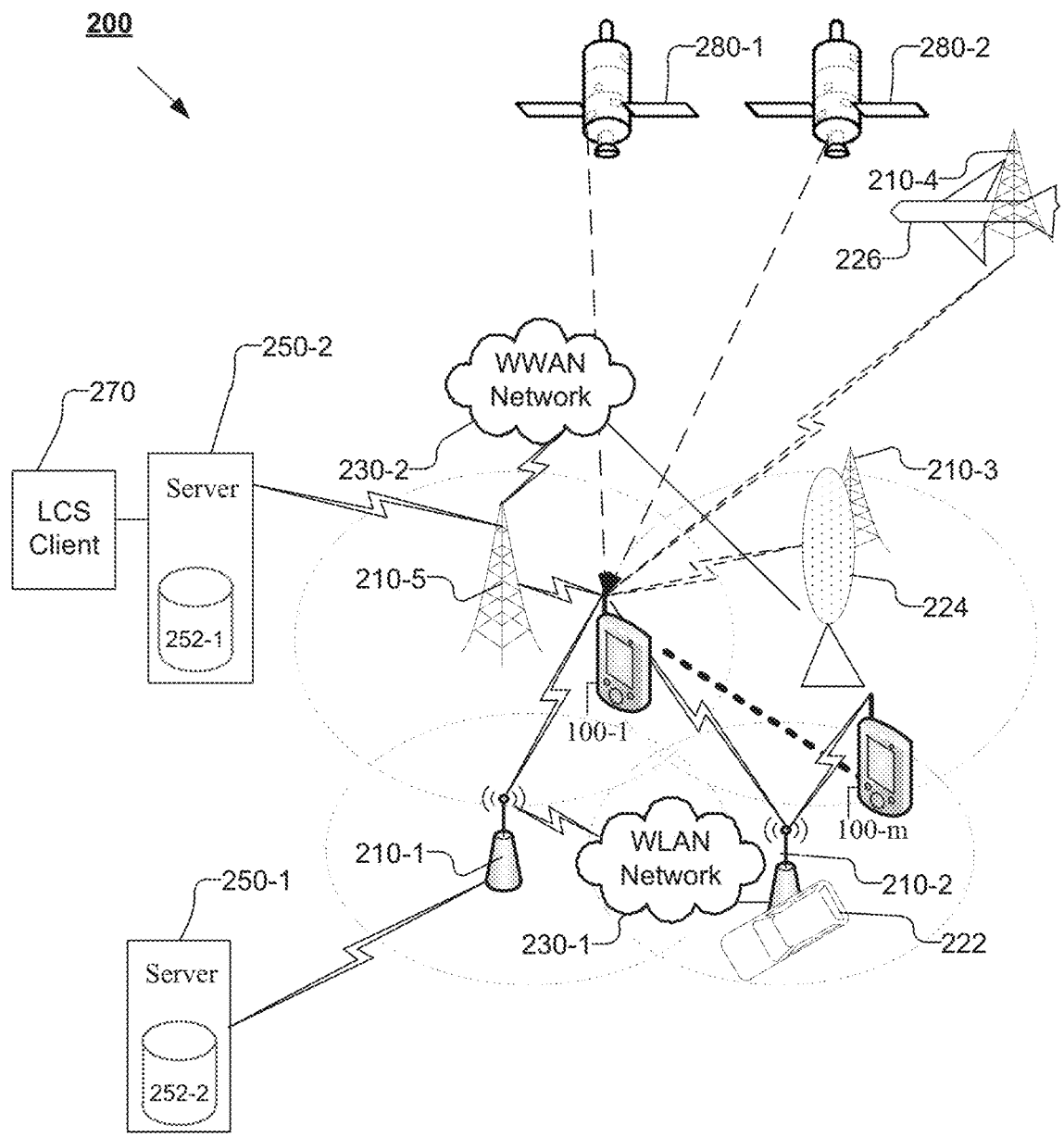
FIG. 2 shows entities in a system to support access point mobility determination.

FIG. 2 shows entities in a system 200 to support access point mobility determination. In some embodiments, system 200 may facilitate AP mobility determination. System 200 may include one or more APs 210-$i$ (shown as APs 210-1 through 210-5 and collectively referred to as APs 210), one or more UEs 100-$j$ (shown as UEs 100-1-100-$m$ and collectively referred to as UEs 100), and servers 250. In some embodiments, servers 250-1 and 250-2 (collectively referred to as servers 250) may perform the functions of a location server that provides location services to LCS client 270 and/or UE 100. Location services may include the transfer of location assistance data, and/or AP mobility indication information using any appropriate protocol. For example, messages (e.g. Long Term Evolution (LTE) Positioning Protocol (LPP) or LPP extensions (LPPe) messages) between APs 210-$i$ (1≤i≤n), UEs 100-$j$ (1≤j≤m) and server 250 may be used to transfer location related information. Server 250 may also perform the functions of another network entity. The transfer of mobility indication information may occur using any appropriate protocol and at a rate appropriate to entities involved in the transfer, such as APs 210, UEs 100, and servers 250. For example, the transfer of location assistance and/or AP mobility indication information may occur over a WWAN 230-2, WLAN 230-1 and/or a Wireless Personal Area Network (WPAN) (not shown in FIG. 2), and/or an ad-hoc network and/or a P2P network. For example, a WPAN may be an IEEE 802.15x network. Note that although APs 210 and UEs 100 are shown separately in FIG. 2, in some instances, UEs may also serve as APs, for example, in an ad-hoc or P2P network.

System 200 shows APs 210-1, 210-2, 210-3, 210-4, and 210-5. As shown in FIG. 2, APs 210-1 and 210-5 are stationary, while APs 210-2, 210-3, and 210-4 may be mobile APs. The term mobile APs is used to refer to APs that are not stationary and/or capable of movement. Although, a mobile AP may be stationary at some point in time, or over some time period, the AP may move at other times. For example, AP 210-2 may be stationary when vehicle/car 222 is parked, but may be mobile when vehicle 222 moves. In FIG. 2, AP 210-3 is mounted on balloon 224, while AP 210-4 is mounted on airplane 226. In general, mobile APs 210 may be mounted on any mobile platform or vehicle and techniques disclosed herein may be used to determine mobile APs. APs 210 may be in communication with one or more UEs 100. UEs 100 may be present in the vicinity of vehicle 222, and/or balloon 224 and/or airplane 226 and may be in communication with one or more of APs 210-2, 210-3, and/or 210-4.

APs 210-3, 210-4, and 210-5 may be coupled to server 250-2 through WWAN 230-2, while APs 210-1 and 210-2 may be coupled to server 250-1 through WLAN 230-1. In some embodiments, servers 250 may perform or include functionality associated with a location server (such as an Evolved Serving Mobile Location Centre (E-SMLC) in LTE). In some embodiments, servers 250 may be cloud based (e.g. accessible over a public cloud or a private cloud). Networks 230-1 and 230-2 are collectively referred to as networks 230. In addition, APs 210 may be communicatively coupled to one or more other entities such as UEs 100, other APs 210, and/or other entities through a WPAN (not shown in FIG. 2). For simplicity, only two servers 250 are shown in FIG. 2. In general, system 200 may comprise multiple APs 210 that provide access to one or more WWANs and/or WLANs and/or WPANs and/or ad-hoc and/or P2P networks 230.

One or more APs 210 may be capable of wirelessly communicating with servers 250 directly and/or through one or more networks 230 that support location services and/or transfer of AP mobility related information. In some embodiments, servers 250 may comprise almanacs and/or databases 252 (hereinafter referred to collectively as databases 252) with identifying information for APs 210 and the locations of one or more APs 210. For example, servers 250 and/or UE 100 may use the stored locations (e.g. in databases 252) of one or more APs 210-$i$, which are visible to UE 100, to estimate a location of UE 100. In some embodiments, servers 250 and/or databases 252 may be cloud based. For example, servers 250 and/or databases 252 may be accessible over and/or hosted on a public cloud, a private cloud, or a hybrid public-private cloud. A public cloud may offer (e.g. by a third-party vendor) cloud-based infrastructure to customers, while a private cloud may offer access to cloud-based infrastructure hosted by an organization. A hybrid cloud may use a public cloud for some functions and a private cloud for other functions.

For example, server 230 may be configured with information pertaining one or more APs 210-$i$, which may include identifying information for APs 210-$i$, location information for APs 210-$i$, etc. In some embodiments, AP related information may be stored in databases 252 (e.g. database 252-1 on server 250-1). Further, APs 210-$i$, which may be present in databases 252, may serve as location anchors, so that if signals from APs 210-$i$ are observed by UE 100, the location of the observing UE 100 may be determined based on the known locations of APs 210-*i*.

In some embodiments, the locations of one or more APs 210-*i* may be provided to server 250 (e.g. by a network operator). In some embodiments, server 250 may add, maintain, or update the locations of APs 210-*i* based on information received from UEs. For example, servers 250 may use crowdsourced data related to APs 210, which may be obtained from a plurality of UEs 100 at various times, to determine whether one or more APs 210 are mobile and/or to determine the locations of APs 210. In some embodiments, the crowdsourced AP data may include AP identifying information (e.g. a MAC address, Base Station ID etc.), AP mobility related information (e.g. whether the AP is mobile or stationary, or a likelihood of mobility), and/or AP location information (e.g. latitude, longitude, altitude).

For example, in some embodiments, when the AP 210 takes the form of a MiFi access point or MyFi access point (hereinafter "MyFi AP"), the MyFi AP may be at a first location, coupled to an electrical socket, and may not move when it serves as an AP. Accordingly, the MyFi AP may be reported (e.g. by a UE 100) to server 250 as being a stationary AP located at the first location. However, when the MyFi AP subsequently serves as an AP at a second location (different from the first location) at a another time, when the MyFi AP is reported, server 250 may flag the MyFi AP as a mobile AP because it is now at the second location. Thus, in some embodiments, crowdsourced information (e.g. from a plurality of UEs) may be used by server 250 to determine AP mobility, even when the AP is perceived as stationary at some given time.

In some embodiments, UEs 100 may provide information related to APs 210-*i* determined to be stationary to servers 250. For example, a UE 100 (e.g. UE 100-1) may provide identifiers associated with visible stationary APs 210 (e.g. AP 210-1 and AP 210-5) to servers 250. In some embodiments, UE 100 may also provide a location of the UE 100 (if available) at the time the measurements were obtained. In some embodiments, when the mobility of an APs 210-*i* cannot be determined with the desired level of confidence, UE 100 may further provide a probability that AP 100 is mobile. In some embodiments, UE 100 may report mobile APs 210 to server 250 along with a mobility indication. In some embodiments, UE 100 may provide the wireless measurements (e.g. RTT, RSSI, OTDOA, Doppler shift measurements etc.) to server(s) 250.

In some embodiments, upon receipt of a message from UE 100 indicating that an AP 210 e.g. AP 210-2 and/or AP 210-3 and/or AP 210-4) is mobile, servers 250 may delete records associated with the mobile AP 210 from location related databases 252. For example, mobile AP 210-2, which may be on vehicle 222, or mobile AP 210-3, which may be on balloon 100-3 may move at various times. Therefore, their locations (even if known at some point in time) cannot be relied upon to determine the locations of UEs 100. In some embodiments, upon a determination that an AP 210 (e.g. AP 210-2 and/or AP 210-3 and/or AP 210-4) is mobile, UEs 100 may not report the APs to servers 250 thereby preventing the addition of mobile APs to location determination database 252. In some embodiments, upon receiving an indication that an AP 210 is mobile, server 250 may classify the AP 210 as mobile. In some embodiments, when an AP 210 is classified as mobile in databases 252, information related to the AP may not used for location determination and/or provided to UEs as location assistance information.

In some embodiments, when an AP 210 is associated with a probability of mobility, servers 250 may calculate an aggregate probability that the AP 210 is mobile based on information (e.g. crowdsourced AP mobility information) provided by a plurality of UEs. The aggregate probability may used to determine whether to use the information associated with the AP 210 for location determination/ location assistance. In some embodiments, the aggregate probability may used to determine whether to delete (or retain) a record associated with an AP 210 in location determination database 252. In some embodiments, if the aggregate probability of mobility associated with an AP 210 exceeds some threshold (indicating that the AP 210 is likely to be mobile), then information associated with the AP 210 may not be used for location determination/location assistance purposes.

In some embodiments, the threshold used to determine whether an AP is to be used for location assistance and/or location determination may be varied based on the number of APs available for location determination in an area. For example, a lower threshold may be used so that more APs are excluded from being used for location assistance and/or location determination when a large number of APs are available for location determination in an area. Conversely, a higher threshold may be used so that more APs may be considered for location assistance and/or location determination when the number of APs available (e.g. for location assistance and/or location determination) in an area is relatively low. Accordingly, in some embodiments, the threshold the threshold used to determine whether an AP is to be used for location assistance and/or location determination may be: (i) region-specific and/or (ii) based on the number of APs 210 available for UE location determination in an area.

In some embodiments, the aggregate probability of mobility for an AP 210 may be associated with a corresponding weight. The weight may vary inversely with probability of mobility so that APs 210 that are more likely to be mobile (e.g. with a high probability of mobility) may have lower weight when being: (a) used for location determination and/or (b) selected for location assistance. Conversely, APs 210 that are less likely to be mobile (e.g. with a lower probability of mobility) may have higher weight when being: (a) used for location determination and/or (b) selected for location assistance. For example, in some embodiments, servers 250 may provide location assistance information to a UE 100 by selecting AP information from database 252 in order of increasing probability of mobility so that APs 210 with the lowest probabilities if mobility are selected first.

As illustrated in FIG. 2, UE 100 may communicate with server 250-2 through APs 210-1 and/or 100-2 using network 230-1, and/or through APs 210-3, 100-4 and/or 100-5 using network 230-2. In some embodiments, UE 100 may receive and measure signals from one or more stationary or non-mobile APs, such as AP 210-5, which may be used for position determination. In some embodiments, APs 210-3, 100-4 and/or 100-5 may form part of a wireless communication network, which may be a WWAN. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. cdma2000 is described in documents from a consortium named "3rd Generation Partnership Project 2" (3GPP2). 3GPP and 3GPP2 documents are publicly available.

As illustrated in FIG. 2, UE 100 may also communicate with server 250-1 through APs 210-1 and/or 100-2 using network 230-1. UE 100 may receive and measure signals from stationary APs such as AP 210-1, which may be used for position determination. In some embodiments, APs 210-1 and 100-2 may form part of a wireless communication network 230-1, which may be a WLAN. For example, a WLAN may be an IEEE 802.11x network.

Further, one or more UEs 100, may be communicatively coupled to one or more APs over a WPAN (not shown in FIG. 2). A WPAN may be a network based on the IEEE 802.15x standards, or some other type of network. For example, a WPAN may take the form of a Bluetooth, Infrared, and/or Near Field Communication (NFC) network. For example, a UE 100 in airplane 226 may be coupled over a WPAN (e.g. Bluetooth) or WLAN to wireless communication system in airplane 226, which in turn may be coupled to WWAN 230-2.

The techniques may also be implemented in conjunction with other combinations of WWAN, WLAN, and/or WPAN. For example, APs 210-$i$, and networks 230 may form part of, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN.

APs 210 may also receive signals from one or more Earth orbiting Space Vehicles (SVs) 280-1 or 280-2 (collectively referred to as SVs 280), which may be part of a satellite positioning system (SPS). SVs 280, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. For example, AP 210 on vehicle 222 may determine a location based on SPS signals and/or characterize mobility based on SPS signals.

In some embodiments, when UE 100 is coupled to a Vehicle-to Vehicle (V2V) communication system (e.g. using IEEE 802.11p DSRC), APs 210 (e.g. AP 210-2 in vehicle 222) detected over the V2V system (e.g. via 802.11p DSRC) may be assumed to be mobile and may not be reported to a server (e.g. a location server). In some embodiments, wireless measurements for AP mobility determination may be disabled when a UE is communicatively coupled with an AP over a V2V system (e.g. 802.11p DSRC).

Figure 3A:
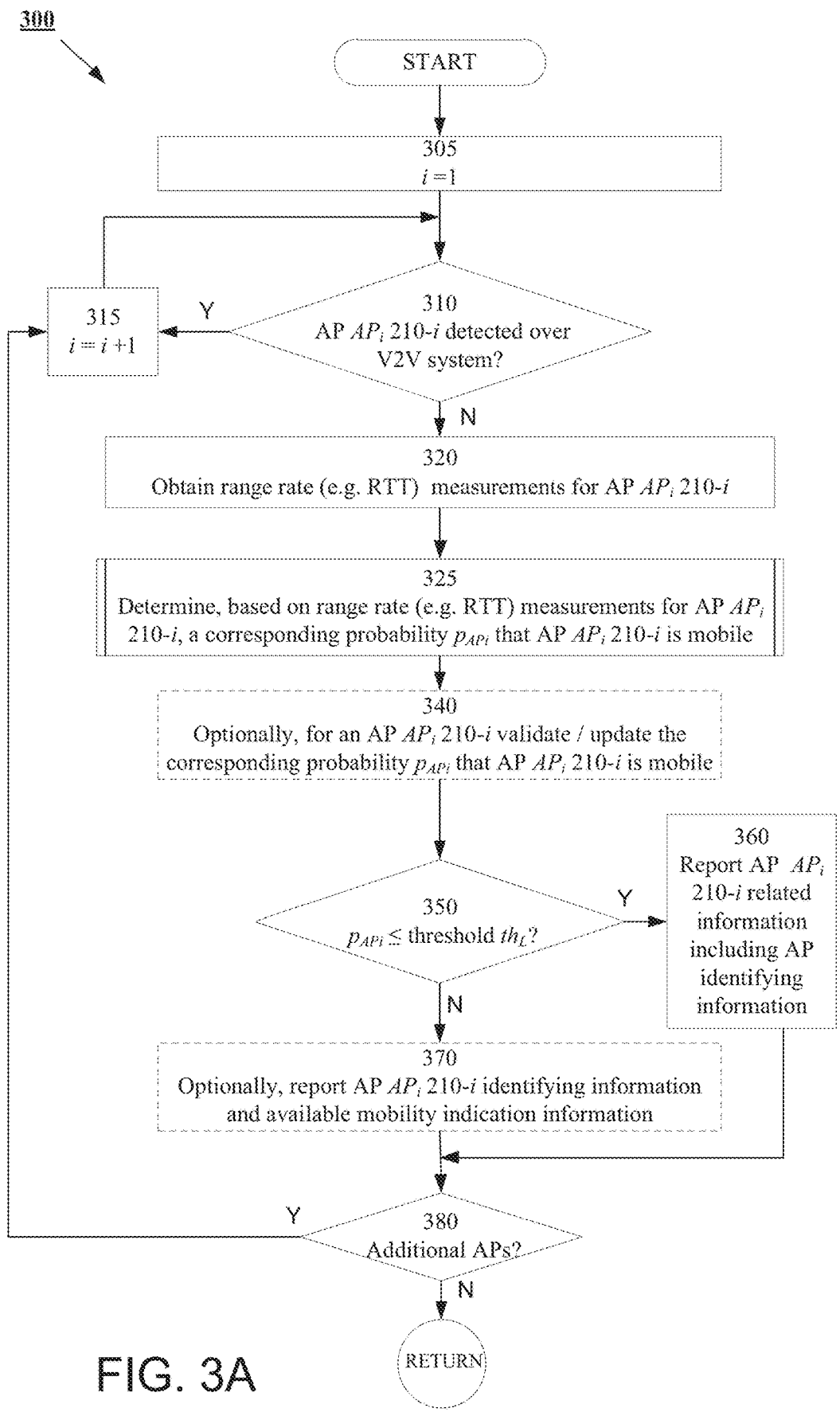
FIGS. 3A and 3B show an exemplary method for detection of mobile APs.

FIG. 3A shows an exemplary method 300 for detection of mobile APs. In some instances, method 300 may be implemented on UE 100/processor(s) 150 based on range rate measurements obtained by transceiver 110 and/or range rate measurements obtained using a ToF sensor. In some embodiments, method 300 may be implemented on UE 100 using processor(s) 150, which may use measurements by transceiver 110/receiver 114 to determine the mobility of one or more APs 210. In some embodiments, processor(s) 150 may use input from one or more of: SPS Receiver 140, camera(s) 180, additional sensors 182, and/or IMU 170 to facilitate detection of mobile APs and/or to provide information that facilitates AP mobility determination.

In some embodiments, measurements of wireless signals (e.g. WWAN, WLAN and/or WPAN) received by transceiver 110/receiver 114 may be used to determine AP mobility. In some embodiments, the determination of AP mobility may occur based on measurements of wireless signals received by transceiver 110/receiver 114 in conjunction with available measurements from one or more of: SPS Receiver 140, camera(s) 180, sensor(s) 185 (e.g. altimeter, barometer etc), and/or IMU 170. For example, measurements from one or more of: SPS Receiver 140, camera(s) 180, sensor bank 185 (e.g. altimeter, barometer etc), and/or IMU 170 may be used to determine a speed and/or a direction of movement of UE 100. In some embodiments, the sensor measurements above may be obtained during the performance of method 300.

In some embodiments, one or more steps in method 300 may be omitted (or optionally performed) based on the configuration, signal availability, and/or functionality available on UE 100 and/or an AP 210 being measured. For example, in some embodiments, blocks 340 and 370 may not be performed.

In method 300, in block 305, a counter i may be initialized. In block 310, it may determined whether an AP (denoted as AP $AP_i$ 210-$i$ in FIG. 3A) was observed (e.g. by UE 100) over a V2V communication system (e.g. using IEEE 802.11p DSRC). If the AP $AP_i$ 210-$i$ was observed (e.g. by UE 100) over a V2V communication system ("Y" in block 310), then, in some embodiments, the AP $AP_i$ 210-$i$ may be ignored and the counter i may be incremented in block 315 to consider the next AP. In some embodiments, an AP $AP_i$ 210-$i$ seen over a V2V communication system may be assumed to be mobile.

In some embodiments, no range rate, range, or other measurements may be obtained (e.g. by UE 100) for AP $AP_i$ 210-$i$ observed over a V2V system. In some embodiments, AP $AP_i$ 210-$i$ observed over a V2V system may not be reported to a server (e.g. server 250). In some embodiments, wireless measurements for AP mobility determination may be disabled when a UE is communicatively coupled with an AP over a V2V communication system (e.g. 802.11p DSRC). Because: (a) server transactions generate network traffic and may incur additional cost (e.g. for data usage by UE 100 and/or a transaction cost when server 250 is hosted on a public cloud); and (b) the number of APs seen by UE 100 over a V2V communication system may be large and the APs seen over V2V are typically mobile, ignoring (not measuring and/or reporting) APs seen over a V2V communicating system may be beneficial. For example, in some instances, not measuring and/or reporting APs seen over a V2V communicating system may: (a) improve UE battery life and resource utilization (e.g. by not measuring APs seen over the V2V communication system); (b) decrease network traffic (e.g. by not reporting APs seen over the V2V communication system); (c) lower reporting cost (e.g. to UE 100 for data usage and any transaction cost associated with processing and storing data at server 250); and (d) improve utilization of server resources (e.g. by obviating the need to process and/or store transactions related to a large number of mobile APs at server 250).

If AP $AP_i$ 210-$i$ was not observed (e.g. by UE 100) over a V2V communication system ("N" in block 310), then, in some embodiments, in block 320, a plurality of range rate (e.g. RTT based) measurements for AP $AP_i$ 210-$i$ may be obtained. For example, when RTT measurements are used, UE 100 may exchange standardized packets (e.g. FTM, probe/beacon, CTS/RTS etc.) with $AP_i$ 210-$i$ to determine RTT using an appropriate protocol.

In block 325, based on the range rate (e.g. RTT based) measurements for AP $AP_i$ 210-$i$, a corresponding probability $p_{APi}$ that AP $AP_i$ 210-$i$ is mobile may be obtained. Block 325 is further outlined in FIG. 3B.

Figure 3B:
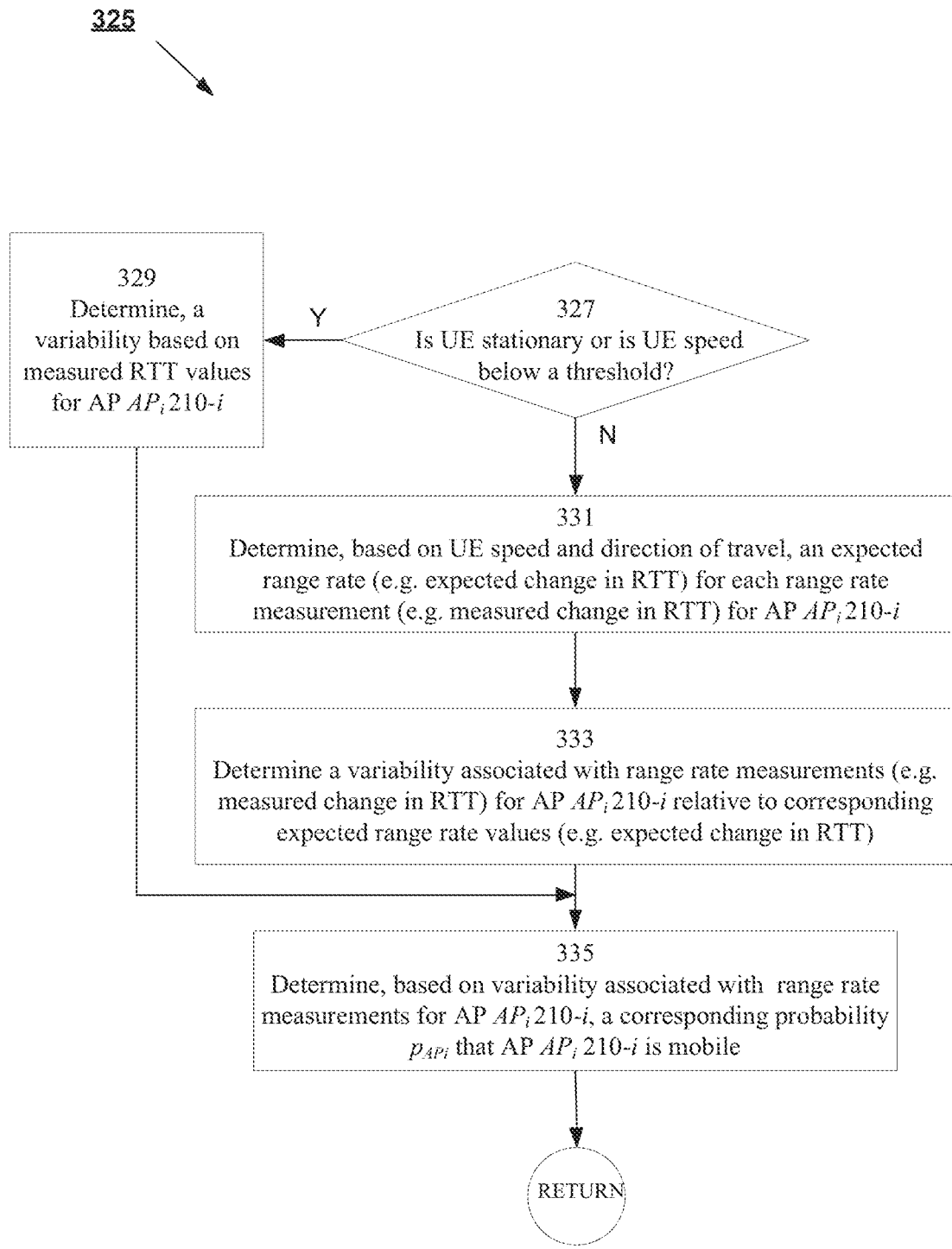

FIG. 3B shows a flowchart 325 outlining a method for determining a probability $p_{APi}$ that AP $AP_i$ 210-$i$ is mobile. Referring to FIG. 3B, in block 327, it may be determined if UE 100 is stationary or is travelling at a speed that does not exceed some threshold. For example, input from one or more of SPS receiver 140, IMU 170, camera(s) 180 (e.g. using VIO) may be used to determine if UE 100 is stationary or moving with a speed below some threshold. If UE 100 is stationary or is travelling at a speed that does not exceed some threshold ("Y" in block 327), then, in block 329, a variability associated with the range rate (e.g. RTT based) measurements for $AP_i$ 210-$i$ may be determined. Any appropriate statistical measure of variability (e.g. standard deviation, variance etc) may be used as a measure of variability. If there is relatively little variation in the range rate measurements, then $AP_i$ 210-$i$ may be determined to be stationary, otherwise (if there is sufficient variation), then $AP_i$ 210-$i$ may be determined to be mobile. For example, if variability of range rate measurements does not exceed some threshold, then UE 100 may determine that $AP_i$ 210-$i$ is stationary. Otherwise, (if variability of range rate measurements exceeds the threshold), then, UE 100 may determine that $AP_i$ 210-$i$ is mobile. Block 335 may then be invoked.

If UE 100 is not stationary or is travelling at a speed that exceeds some threshold ("N" in block 327), then, in block 333, a variability associated with range rate measurements (e.g. measured change in RTT) for AP $AP_i$ 210-$i$ relative to corresponding expected range rate values (e.g. expected change in RTT) may be determined. In block 333, UE 100/processor(s) 150 may determine an expected range rate (e.g. expected change in RTT values) based on the speed and direction of movement of UE 100 by assuming that AP $AP_i$ 210-$i$ is stationary. The mobility of AP $AP_i$ 210-$i$ may be determined based on the variability of the range rate measurements (e.g. measured change in RTT) relative to expected range rate values (e.g. expected change in RTT values).

For example, in block 333, for each range rate measurement (e.g. measured RTT change) UE 100 may determine a corresponding expected range rate (e.g. expected change in RTT) based on an estimated speed and/or direction of movement of UE 100 by assuming that AP $AP_i$ 210-$i$ is stationary. The estimated speed and direction of movement of UE 100 may be determined based on input from one or more of SPS receiver 140, IMU 170, camera(s) 180 (e.g. using VIO) and/or a Vehicular Navigation System (VNS) to which UE 100 may be coupled. As another example, RSSI measurements from transceiver 110 may used to determine if UE 100 travelling toward or away from AP $AP_i$ 210-$i$. For example, if RSSI levels of wireless signals from AP $AP_i$ 210-$i$ strengthen with time, then, UE 100 may be assumed to be moving toward AP $AP_i$ 210-$i$. On the other hand, if RSSI level measurements of wireless signals from AP $AP_i$ 210-$i$ weaken with time, then, UE 100 may be assumed to be moving away from AP $AP_i$ 210-$i$. In some embodiments, input (e.g. from one or more of SPS receiver 140, IMU 170, camera(s) 180, RSSI measurements, and/or the VNS) may be used to determine a speed of UE 100 and/or a direction of travel (e.g. toward AP $AP_i$ 210-$i$ or away from AP $AP_i$ 210-$i$) of UE 100.

In some embodiments, in block 333, a variability associated with the range rate measurements (e.g. measured change in RTT) for AP $AP_i$ 210-$i$ relative to corresponding expected range rate values (e.g. expected change in RTT) may be determined. When the range rate measurements (e.g. measured change in RTT values) correspond closely to the expected range rate (e.g. expected change in RTT values), then, AP $AP_i$ 210-$i$ may be determined to be stationary. On the other hand, if there is sufficient variation between measured range rate and expected range rate, AP $AP_i$ 210-$i$ may be determined to be mobile. For example, if variability of range rate measurements (relative to corresponding expected range rate values) does not exceed some threshold, then UE 100 may determine that AP $AP_i$ 210-$i$ is stationary. Otherwise, (if variability of range measurements exceeds the threshold), then, UE 100 may determine that $AP_i$ 210-$i$ is mobile. Block 335 may then be invoked.

In block 335, based, in part, on the measure of variability associated with range rate measurements for AP $AP_i$ 210-$i$, a corresponding probability $p_{APi}$ that AP $AP_i$ 210-$i$ is mobile may determined and associated with $AP_i$ 210-$i$. In some embodiments, the probability may be binary, where $p_{APi}=1$ may indicate that AP $AP_i$ 210-$i$ is mobile, while $p_{APi}=0$ may indicate that AP $AP_i$ 210-$i$ is stationary. As one example, to determine a binary valued probability $p_{APi}$, the variability associated with RTT measurements (e.g. as determined in block 329 or block 333) may be compared to a threshold and $p_{APi}$ may be assigned a value of 1, if the variability exceeds the threshold; or alternatively, $p_{APi}$ may be assigned a value of 0, if the variability does not exceed the threshold.

In some embodiments, in block 335, a value between 0 and 1 ($0 \le p_{APi} \le 1$) may be assigned to $p_{APi}$ based on the RTT variability (e.g. as determined in block 329 or block 333). For example, the probability $p_{APi}$ may be obtained as some function of the RTT variability. Control may then return to method 300 (FIG. 3A).

Referring to FIG. 3A, following block 325, block 340 may be optionally executed. In some embodiments, block 340 may not be performed and block 350 may be invoked. When block 340 is performed, then, in some embodiments, in block 340, the probability $p_{APi}$ obtained in block 325, may be updated, or validated using another technique. For example, in block 340, Doppler frequency shift measurements may be used to update the probability $p_{APi}$ is moving. In some embodiments, the functionality of block 340 (in FIG. 3A) may be similar to functionality of blocks 420 and 425 (in FIG. 4A below). In some embodiments, the RTT measurements for $AP_i$ 210-$i$ and Doppler frequency measurements for AP $AP_i$ 210-$i$ may be obtained concurrently (e.g. in block 320) instead of in block 340.

When UE 100 is determined to be stationary (e.g. in block 327 in FIG. 3B), a change in the frequency of waves received by UE 100 (relative to the nominal frequency of transmission) may occur because of movement of AP $AP_i$ 210-$i$. If the measured frequency of transmission of AP $AP_i$ 210-$i$ ($f_{APi}^M$) is different from the nominal frequency of transmission for some frequency band ($F_j$) by more than some threshold (e.g. $\Delta f$), then, the inference that $AP_i$ 210-$i$ is mobile may be validated. In some embodiments, the probability that AP $AP_i$ 210-$i$ is mobile may also be updated. For example, the probability $p_{APi}$ in block 325 may be updated based on the degree to which measured frequency (f) differs from the nominal frequency ($F_1$). For example, in one embodiment, the probability $p_{APi}$ may be updated based, in part, on some function of $|f_{Api}^M - F_j|$.

When UE 100 is determined not to be stationary (e.g. in block 327 in FIG. 3B), in some embodiments, based on the speed and direction of movement of UE 100 (e.g. toward or away from an AP), an expected Doppler frequency (or an expected Doppler shift) $F_j^{PD}$ relative to a nominal frequency ($F_j$) may be predicted for signals transmitted by AP $AP_i$ 210-$i$ by assuming that the AP $AP_i$ 210-$i$ is stationary. If the measured Doppler frequency $f_{APi}^M$ differs from the expected Doppler frequency $F_j^{PD}$ by more than some threshold (e.g. $\Delta f$), then, the inference that AP $AP_i$ 210-$i$ is mobile may be validated. In some embodiments, the probability $p_{APi}$ that $AP_i$ 210-$i$ is mobile may also be updated. For example, the probability $p_{APi}$ in block 325 may be updated based on the degree to which measured frequency $f_{APi}^M$ differs from the expected Doppler frequency $F_j^{PD}$. For example, in one embodiment, the probability $p_{APi}$ may be updated based, in part, on some function of $|f_{APi}^M - F_j^{PD}|$.

In block 350, in some embodiments, it may be determined if $p_{APi}$ does not exceed some threshold likelihood of mobility ($th_L$). If $p_{APi}$ does not exceed $th_L$ ("Y" in block 350), then, in block 360, information pertaining to AP $AP_i$ 210-$i$ may be reported (e.g. by UE 100 to server 250). For example, the information may include identifying information for $AP_i$ 210-$i$, location information for AP $AP_i$ 210-$i$ (if available, e.g. based on wireless measurements by UE 100), location information for UE 100 at the time of the measurements (e.g. if available to UE 100 based on input from SPS receiver 140, VBP, and/or a VNS). In some embodiments, the identifying information for AP $AP_i$ 210-$i$ may include one or more of: a Medium Access Control (MAC) address associated with $AP_i$ 210-$i$, Basic Service Set Identification (BSSID), Service Set Identification (SSID), a base station identifier, and/or another network identifier. The identifying information may uniquely identify AP $AP_i$ 210-$i$.

If $p_{APi}$ exceed $th_L$ ("N" in block 350), then, in some embodiments, block 370 may optionally be performed. In some embodiments, block 370 may be omitted, and block 380 may be invoked. When block 370 is performed, then, in block 370, identifying information pertaining to mobile $AP_i$ 210-$i$ may be reported (e.g. by UE 100 to server 250), In some embodiments, mobility indication information (e.g. an estimated speed, direction of travel of $AP_i$ 210-$i$, etc., if available) may be reported (e.g. by UE 100 to server 250). In some embodiments, a server 250 receiving information about a mobile AP may delete the AP from database 252 and/or update a record associated with the AP to indicate that it is mobile and/or unsuitable for location determination).

In block 380, if there are additional APs, then in block 315, the counter i is incremented and the next AP is processed in the subsequent iteration, otherwise, control may be returned to the calling routine.

Figure 4A:
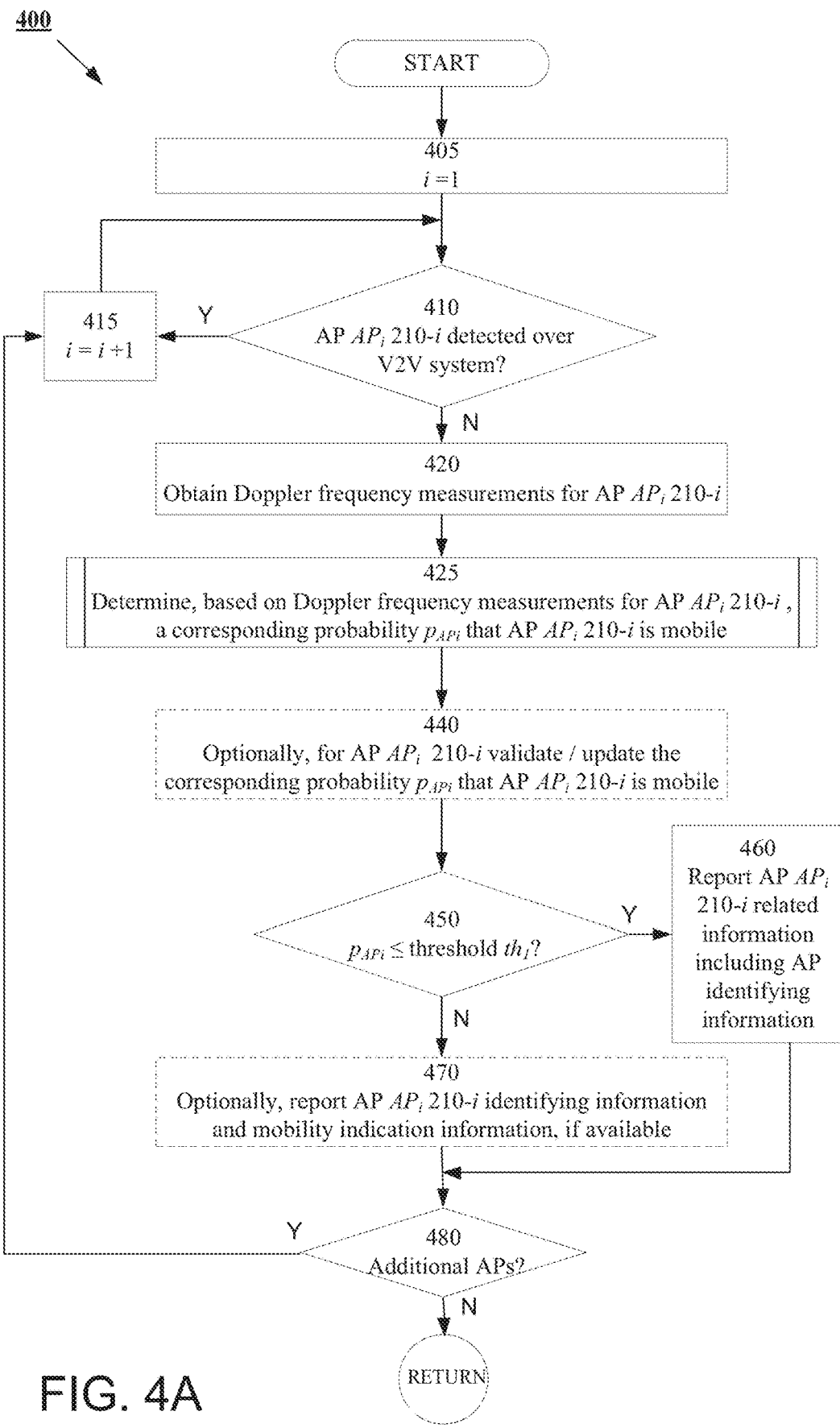
FIGS. 4A and 4B show an exemplary method for detection of mobile APs.

FIG. 4A shows an exemplary method 400 for detection of mobile APs. In some instances, method 400 may be implemented on an UE 100/processor(s) 150). In some embodiments, method 400 may be implemented on UE 100 using processor(s) 150, which may use measurements by transceiver 110/receiver 114 to determine the mobility of one or more APs 210. In some embodiments, one or more of SPS Receiver 140, camera(s) 180, sensor(s) 185, and/or IMU 170 may also be used to facilitate detection of AP mobility and/or to provide information to facilitate mobility determination for an AP 210.

In some embodiments, wireless signal measurements (e.g. WWAN, WLAN and/or WPAN) based on signals received by transceiver 110/receiver 114 may be used to determine AP mobility. In some embodiments, the determination of AP mobility may occur based on measurements of wireless signals received by transceiver 110/receiver 114 in conjunction with available measurements from one or more of: SPS Receiver 140, camera(s) 180, sensor(s) 185 (e.g. altimeter, barometer etc), and/or IMU 170. For example, measurements from one or more of: SPS Receiver 140, camera(s) 180, sensor(s) 185 (e.g. altimeter, barometer etc), and/or IMU 170 may be used to determine a speed and/or a direction of travel of UE 100. In some embodiments, sensor measurements may be obtained concurrently with the performance of method 400.

In some embodiments, one or more steps in method 400 may be omitted (or optionally performed) based on the configuration, signal availability, and/or functionality available on UE 100 and/or an AP 210 being measured. For example, in some embodiments, blocks 440 and 470 may not be performed.

In method 400, in block 405, a counter i may be initialized. In block 410, it may determined whether an AP denoted as AP $AP_i$ 210-$i$ in FIG. 4A was observed (e.g. by UE 100) over a V2V communication system (e.g. using IEEE 802.11p DSRC). If the AP $AP_i$ 210-$i$ was observed (e.g. by UE 100) over a V2V communication system ("Y" in block 410), then, in some embodiments, the AP $AP_i$ 210-$i$ may be ignored and the counter i may be incremented in block 415 to consider the next AP. In some embodiments, an AP $AP_i$ 210-$i$ seen or detected over a V2V communication system may be assumed to be mobile by UE 100.

In some embodiments, AP $AP_i$ 210-$i$ observed over a V2V system may not be measured (e.g. by UE 100) and/or reported to a server (e.g. for reasons outlined above in relation to FIG. 3A). In some embodiments, wireless measurements for AP mobility determination may be disabled when UE 100 is communicatively coupled with an AP over a V2V communication system.

If the AP $AP_i$ 210-$i$ was not observed (e.g. by UE 100) over a V2V communication system ("N" in block 410), then, in some embodiments, in block 420, a plurality of Doppler frequency measurements for AP $AP_i$ 210-$i$ may be obtained. For example, UE 100 may measure (e.g. using transceiver 110/receiver 114) a frequency at which signals from $AP_i$ 210-$i$ are received. As outlined previously, movement of AP, 210-$i$ relative to UE 100 will cause a change the observed or measured frequency relative to the nominal frequency.

In block 425, based on the Doppler frequency measurements for AP $AP_i$ 210-$i$, a corresponding probability $p_{APi}$ that AP $AP_i$ 210-$i$ is mobile may be obtained. Block 425 is further outlined in FIG. 4B.

Figure 4B:
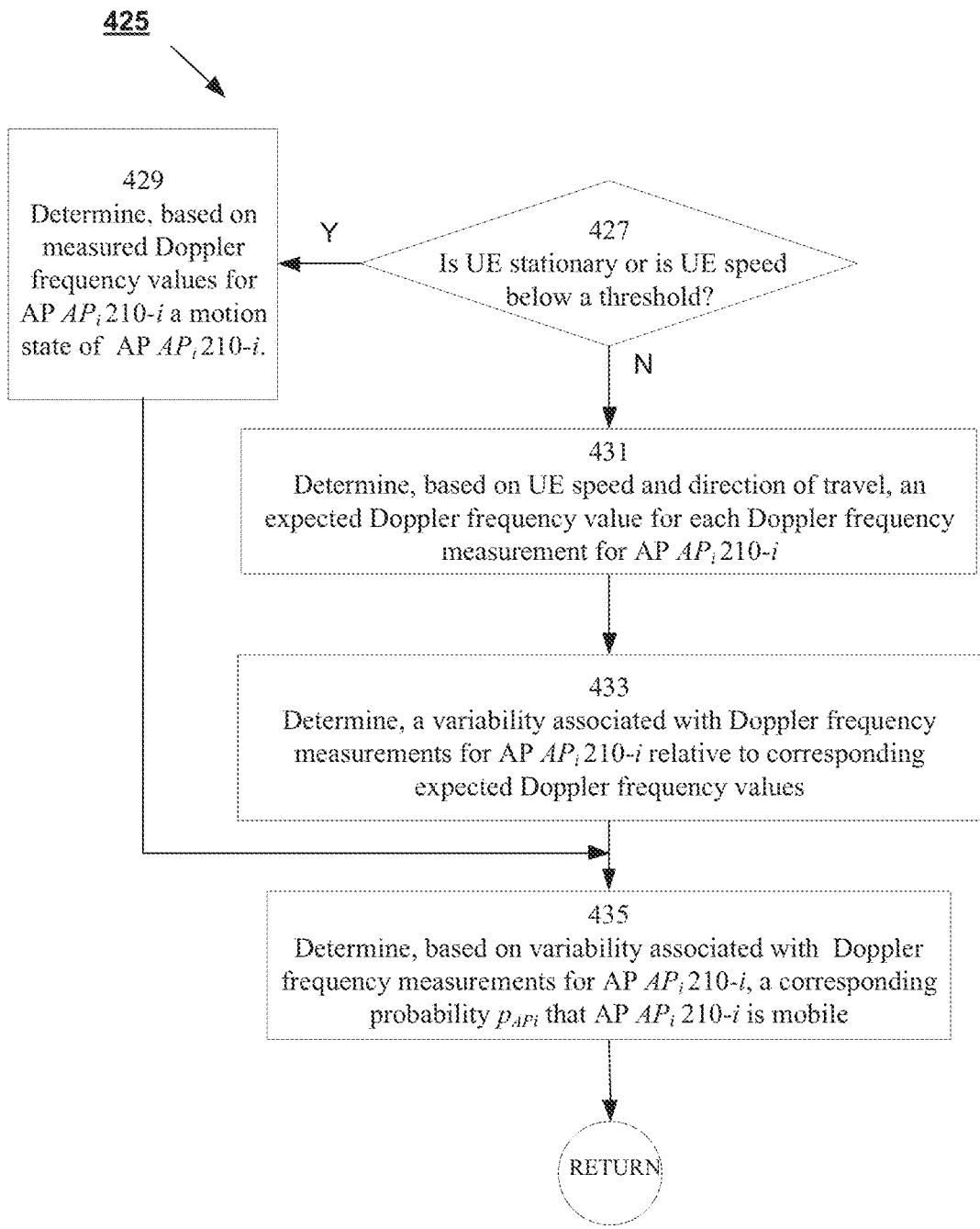

FIG. 4B shows a flowchart 425 outlining a method for determining a probability $p_{APi}$ that AP $AP_i$ 210-$i$ is mobile.

Referring to FIG. 4B, in block 427, it may be determined if UE 100 is stationary or is travelling at a speed that does not exceed some threshold. For example, input from one or more of SPS receiver 140, IMU 170, camera(s) 180 (e.g. using VIO) and/or a VNS to which UE 100 may be coupled may be used to determine if UE 100 is stationary or is travelling at a speed that does not exceed some threshold.

If UE 100 is stationary or is travelling at a speed that does not exceed some threshold ("Y" in block 427), then, in block 429, based on measured Doppler frequency values for AP $AP_i$ 210-i, a motion state of AP $AP_i$ 210-i may be determined. For example, an absolute difference $|f_{APi}^M - F_j|$ between the measured Doppler frequency values $f_{APi}^M$ for AP $AP_i$ 210-i and a nominal frequency $F_1$ (at which AP $AP_i$ 210-i is transmitting) may be determined. If the absolute difference $|f_{APi}^M - F_j|$ exceeds some threshold $\Delta f$, then, AP $AP_i$ 210-I may be determined to be mobile. On the other hand, if the absolute difference $|f_{APi}^M - F_j|$ does not exceed the threshold $4f$, then, AP $AP_i$ 210-i may be determined to be stationary. Block 435 may then be invoked.

If UE 100 is not stationary or is travelling at a speed that exceeds some threshold ("N" in block 427), then, in block 433, an expected Doppler frequency value (relative to a nominal frequency $F_j$ at which AP $AP_i$ 210-i is transmitting) may be determined by UE 100 based on the speed and direction of travel of UE 100 by assuming that the AP $AP_i$ 210-i is stationary.

In some embodiments, in block 433, a variability associated with Doppler frequency measurements for AP $AP_i$ 210-i relative to corresponding expected Doppler frequency values may be determined. In some embodiments, the variability may be based on the difference between the measured Doppler frequencies relative to corresponding expected Doppler frequency values. For example, in block 433, for a nominal frequency $F_j$ at which AP $AP_i$ 210-i is transmitting, UE 100 may determine a corresponding expected Doppler frequency value $F_j^{PD}$ based on the estimated speed and/or direction of movement of UE 100 at the time of measurement by assuming that AP $AP_i$ 210-i is stationary. When measured Doppler frequency values $f_{APi}^M$ correspond closely to expected Doppler frequency values $F_j^{PD}$, then AP $AP_i$ 210-i may be determined to be stationary. On the other hand, if there is a significant difference between measured Doppler frequency values and expected Doppler frequency values, then AP $AP_i$ 210-i may be mobile.

As another example, if the average of the absolute values of differences between the measured Doppler frequency values $f_{APi}^M$ and the expected Doppler frequency values $F_j^{PD}$ exceeds some threshold, then, AP $AP_i$ 210-i may be determined to be mobile. On the other hand, in the example above, if the average of the absolute values of differences between the measured Doppler frequency values $f_{APi}^M$ and the expected Doppler frequency values $F_j^{PD}$ does not exceed the threshold, then, AP $AP_i$ 210-i may be determined to be stationary.

In some embodiments, the estimated speed and direction of movement of UE 100 may be determined based on input from one or more of SPS receiver 140, IMU 170, camera(s) 180 (e.g. using VIO) and/or a Vehicular Navigation System (VNS) to which UE 100 may be coupled. As another example, RSSI measurements from transceiver 110 may be used to determine if UE 100 travelling toward or away from $AP_i$ 210-i. The input (e.g. from one or more of SPS receiver 140, IMU 170, camera(s) 180, RSSI measurements, and/or the VNS) may be used to determine a speed of UE 100 and/or a direction of travel (e.g. toward $AP_i$ 210-i or away from $AP_i$ 210-i) of UE 100. In some embodiments, based on the speed of UE 100 and/or a direction of travel of UE 100 relative to AP 210-i (e.g. toward $AP_i$ 210-i or away from $AP_i$ 210-i), the expected Doppler frequency value may be calculated for each Doppler frequency measurement assuming that $AP_i$ 210-i is stationary.

In block 435, based, in part, on the degree to which with Doppler frequency measurements for AP $AP_i$ 210-i (e.g. as determined in block 429 or block 433) correspond to the expected Doppler frequency values, a corresponding probability $p_{APi}$ that AP $AP_i$ 210-i is mobile may determined and associated with $AP_i$ 210-i. In some embodiments, the probability may be binary, where $p_{APi} = 1$ may indicate that $AP_i$ 210-i is mobile, while $p_{APi} = 0$ may indicate that $AP_i$ 210-i is stationary. As one example, to determine a binary valued probability $p_{APi}$, the average of the differences between the measured Doppler frequency values $f_{APi}^M$ and the expected Doppler frequency values $F_j^{PD}$ may be compared to a threshold. If the average exceed the threshold then $p_{APi}$ may be set to 1 (indicating that AP $AP_i$ 210-i is mobile), whereas if the average does not exceed the threshold, then $p_{APi}$ may be set to 0 (indicating that AP $AP_i$ 210-i is stationary). In general, any statistical measure of central tendency (e.g. median or mode) may be used instead of the average when determining if an AP $AP_i$ 210-i is mobile.

In some embodiments, a value between 0 and 1 ($0 \leq p_{APi} \leq 1$) may be assigned to $p_{APi}$ based on the degree to which the measured Doppler frequency values $f_{APi}^M$ and the expected Doppler frequency values $F_j^{PD}$ correspond to each other. As another example, a value between 0 and 1 ($0 \leq p_{APi} \leq 1$) may be assigned to $p_{APi}$ based on a function of the differences between the measured Doppler frequency values $f_{APi}^M$ and the expected Doppler frequency values $F_j^{PD}$. Control may then return to method 400 (FIG. 4A).

Referring to FIG. 4A, following block 425, block 440 may be optionally executed. In some embodiments, block 440 may not be performed and block 450 may be invoked. When block 440 is performed, then, in some embodiments, in block 440, the probability $p_{APi}$ obtained in block 425, may be updated or validated using another technique. For example, in block 440, range rate measurements (e.g. measured change in RTT) may be used to update the probability $p_{APi}$ is moving. In some embodiments, the functionality of block 440 (in FIG. 3A) may be similar to functionality of blocks 320 and 325 (in FIG. 4A). In some embodiments, the range rate measurements for $AP_i$ 210-i and Doppler frequency measurements for $AP_i$ 210-i may be obtained concurrently (e.g. in block 420).

When UE 100 is determined to be stationary (e.g. in block 427 in FIG. 4B), range rate measurements (e.g. measured change in RTT) may indicate movement of $AP_i$ 210-i. If the range rate measurements exhibit significant variability when UE 100 is stationary, then, the inference that $AP_i$ 210-i is mobile may be validated. In some embodiments, the probability that $AP_i$ 210-i is mobile may also be updated. For example, the probability $p_{APi}$ in block 425 may be updated based on the degree of variability in the measured range rate measurements (e.g. measured change in RTT). For example, in one embodiment, the probability $p_{APi}$ may be updated based, in part, on some function of the variability (e.g. as some function of a standard deviation or variance associated with the measured range rate values).

When UE 100 is determined not to be stationary (e.g. in block 427 in FIG. 4B), then, based on the speed and direction of movement of UE 100 (e.g. toward or away from an AP), an expected range rate value (e.g. expected change in RTT) may be predicted for each range rate measurement for AP $AP_i$ 210-i by assuming that the AP $AP_i$ 210-i is stationary. If the range rate measurement (e.g. measured change in RTT) differs from the expected range rate value (e.g. expected change in RTT) by more than some threshold (e.g. ΔRTT), then, an inference that AP $AP_i$ 210-$i$ is mobile may be validated. On the other hand, if the range rate measurement (e.g. measured change in RTT) does not differ from the expected range rate value (e.g. expected change in RTT) by more than the threshold (e.g. ΔRTT), then, an inference that AP $AP_i$ 210-$i$ is stationary may be validated. In some embodiments, the probability that AP $AP_i$ 210-$i$ is mobile may also be updated. For example, the probability $p_{APi}$ in block 425 may be updated based on the degree to which measured RTT change differs from the expected RTT change.

In block 450, in some embodiments, it may be determined if $p_{APi}$ does not exceed some threshold likelihood of mobility ($th_L$). If $p_{APi}$ does not exceed $th_L$ ("Y" in block 450), then, in block 460, information pertaining to $AP_i$ 210-$i$ may be reported (e.g. by UE 100 to server 250). For example, the information may include identifying information for $AP_i$ 210-$i$, location information for $AP_i$ 210-$i$ (if available, e.g. based on wireless measurements by UE 100), location information for UE 100 at the time of the measurements (e.g. if available to UE 100 based on input from SPS receiver 140, VIO, and/or a VNS). In some embodiments, the identifying information for $AP_i$ 210-$i$ may include one or more of: a Medium Access Control (MAC) address associated with $AP_i$ 210-$i$, Basic Service Set Identification (BSSID), Service Set Identification (SSID), a base station identifier, and/or another network identifier. The identifying information may uniquely identify AP 210-$i$.

If $p_{APi}$ exceeds $th_L$ ("N" in block 450), then, in some embodiments, block 470 may optionally be performed. In some embodiments, block 470 may be omitted, and block 480 may be invoked. When block 470 is performed, then, in block 470, identifying information pertaining to a mobile $AP_i$ 210-$i$ may be reported (e.g. by UE 100 to server 250), In some embodiments, mobility indication information (e.g. an estimated speed, direction of travel of $AP_i$ 210-$i$, etc., if available) may be reported (e.g. by UE 100 to server 250). In some embodiments, a server 250 receiving information about a mobile AP may delete the AP from database 252 and/or update a record associated with the AP to indicate that it is mobile and/or unsuitable for location determination).

In block 480, if there are additional APs, then in block 315, the counter i is incremented and the next AP is processed in the subsequent iteration, otherwise, control may be returned to the calling routine.

Figure 5A:
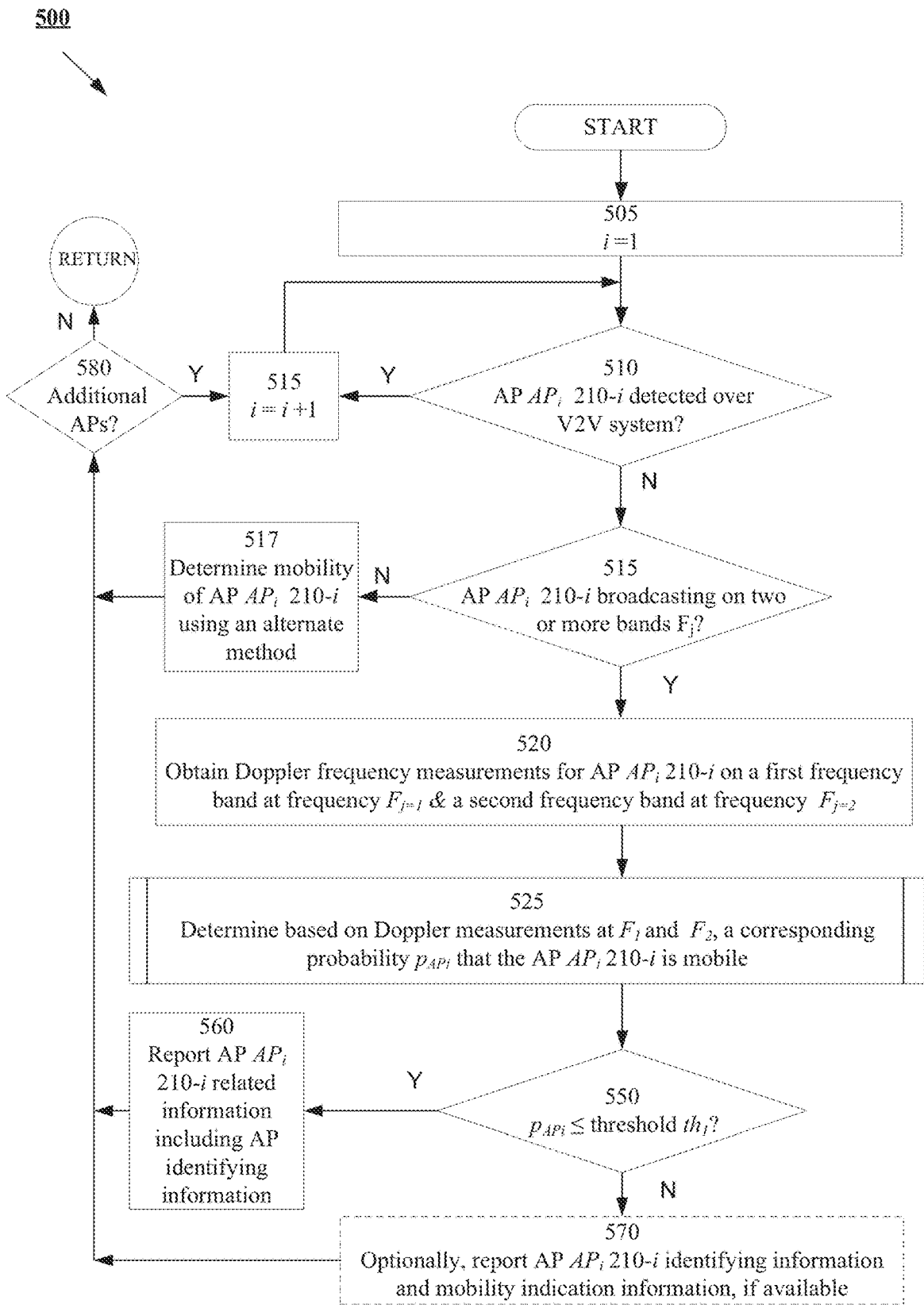

FIG. 5A shows an exemplary method 500 for detection of mobile APs. In some instances, method 500 may be implemented on an UE 100 (e.g. using processor(s) 150). In some embodiments, method 500 may be implemented on UE 100 using processor(s) 150, which may use measurements by transceiver 110 to determine the mobility of one or more APs 210. In some embodiments, one or more of SPS Receiver 140, camera(s) 180, sensor(s) 185, and/or IMU 170 may also be used to facilitate detection of mobile APs and/or to provide information to facilitate AP mobility determination.

In some embodiments, wireless signal measurements (e.g. WWAN, WLAN and/or WPAN) based on signals received by transceiver 110/receiver 114 may also be used to determine AP mobility. In some embodiments, the determination of AP mobility may occur based on measurements of wireless signals using transceiver 110/receiver 114 in conjunction with available measurements from one or more of: SPS Receiver 140, camera(s) 180, sensor(s) 185 (e.g. altimeter, barometer etc), and/or IMU 170. For example, measurements from one or more of: SPS Receiver 140, camera(s) 180, sensor(s) 185 (e.g. altimeter, barometer etc), and/or IMU 170 may be used to determine a speed and/or a direction of travel of UE 100. In some embodiments, sensor measurements may be obtained concurrently with the performance of method 400.

In some embodiments, one or more steps in method 500 may be omitted (or optionally performed) based on the configuration, signal availability, and/or functionality available on UE 100 and/or an AP 210 being measured. For example, in some embodiments, block 570 may not be performed.

In method 500, in block 505, a counter i may be initialized. In block 510, it may determined whether an AP denoted as AP $AP_i$ 210-$i$ in FIG. 5A was observed (e.g. by UE 100) over a V2V communication system (e.g. using IEEE 802.11p DSRC). If the AP $AP_i$ 210-$i$ was observed (e.g. by UE 100) over a V2V communication system ("Y" in block 510), then, in some embodiments, the AP $AP_i$ 210-$i$ may be ignored and the counter i may be incremented in block 515 to consider the next AP. In some embodiments, an AP $AP_i$ 210-$i$ seen over a V2V communication system may be assumed to be mobile.

In some embodiments, AP $AP_i$ 210-$i$ observed over a V2V system may not be measured (e.g. by UE 100) and/or reported to a server (e.g. for reasons outlined above in relation to FIG. 3A). In some embodiments, wireless measurements for AP mobility determination may be disabled when a UE is communicatively coupled with an AP over a V2V communication system.

If the AP $AP_i$ 210-$i$ was not observed (e.g. by UE 100) over a V2V communication system ("N" in block 510), then, in some embodiments, in block 515, it may be determined whether AP $AP_i$ 210-$i$ is broadcasting over a plurality of frequency bands $F_1$. For example, UE 100 may determine if AP $AP_i$ 210-$i$ is broadcasting over the 2.4 GHz and 5 GHz frequency bands. If AP $AP_i$ 210-$i$ is broadcasting over a single band ("N" in block 515), then, in block 517, an alternate method may be used to determine the mobility of AP $AP_i$ 210-$i$. For example, block 517 may use a single iteration of: method 300 (outlined in FIG. 3A) or a single iteration of method 400 (outlined in FIG. 4A) to determine whether AP $AP_i$ 210-$i$ is mobile, or to determine a probability $p_{APi}$ that AP $AP_i$ 210-$i$ is mobile.

As outlined earlier, relative motion between UE 100 and AP $AP_i$ 210-$i$ results in changes in the measured frequency relative to the nominal frequency. Accordingly, in some embodiments, if AP $AP_i$ 210-$i$ is broadcasting over a plurality of nominal frequency bands $F_1$ where j=1, 2 . . . and j>1 ("Y" in block 515), then, in block 520, Doppler frequency measurements for AP $AP_i$ 210-$i$ may be obtained on two or more frequency bands. For example, UE 100 may obtain Doppler frequency measurements on a first frequency band $F_{j=1}$ (e.g. $F_1$=2.4 GHz) and a second frequency band $F_{j=2}$ ((e.g. $F_2$=5 GHz).

Next, in block 525, a probability $p_{APi}$ that AP $AP_i$ 210-$i$ is mobile may be determined based on the Doppler frequency measurements of AP $AP_i$ 210-$i$ at frequency bands $F_1$ and $F_2$. Block 525 is further described in FIG. 5B.

FIG. 5B shows a flowchart for block 525 outlining a method for determining a probability $p_{APi}$ that AP $AP_i$ 210-$i$ is mobile.

Referring to FIG. 5B, in block 527, Doppler frequency measurements at a first frequency band $F_1$ may be used to determine a speed and direction of movement of AP 100. For example, if UE 100 is determined to be stationary or is travelling at a speed below some threshold (e.g. based on input from one or more of SPS receiver 140, IMU 170, VIO, or a VNS to which UE is communicatively coupled), then the speed and direction of movement of AP 100 may be determined directly based on Doppler frequency measurements at band $F_1$.

On the other hand, if UE 100 is not stationary or is travelling at a speed that exceeds some threshold (e.g. based on input from one or more of SPS receiver 140, IMU 170, VIO, or a VNS to which UE is communicatively coupled), then, based on the assumption that AP $AP_i$ 210-$i$ is stationary, a corresponding first expected Doppler frequency $F_{Dj}^{e}$ may be calculated corresponding to a first nominal frequency band $F_j$ used by AP $AP_i$ 210-$i$ for transmissions. If the Doppler frequency measurements associated with nominal frequency band $F_1$ (e.g. obtained in block 520) correspond relatively closed to the expected Doppler frequency $F_{D1}^{e}$ (for j=1), then AP $AP_i$ 210-$i$ may be determined to be stationary. If the Doppler frequency measurements at band $F_1$ (e.g. obtained in block 520) differ from the expected Doppler frequency $F_{D1}^{e}$ (for j=1), then AP $AP_i$ 210-$i$ may be determined to be mobile. In some embodiments, when AP $AP_i$ 210-$i$ is mobile, a speed and direction of movement of AP $AP_i$ 210-$i$ may be calculated. For example, when UE 100 is mobile, one or more of: (i) an absolute speed (e.g. ground speed) and direction of AP $AP_i$ 210-$i$, or (ii) a speed and direction of movement of AP $AP_i$ 210-$i$ relative to UE 100, may be calculated based on the Doppler frequency measurements at band $F_1$.

In block 529, based, in part, on the speed and direction of movement of AP $AP_i$ 210-$i$ relative to UE 100 (e.g. obtained in block 527 using Doppler frequency measurements at band $F_1$), an expected Doppler frequency $F_{D2}^{e}$ (for j=2) may be calculated for a second frequency band $F_2$.

In block 531, based on the Doppler frequency measurements at band $F_2$ (e.g. obtained in block 520), a speed and direction of movement of AP $AP_i$ 210-$i$ may be calculated. In some embodiments, a speed and direction of movement of AP $AP_i$ 210-$i$ relative to UE 100 may be calculated, as well as an absolute speed and direction of movement of AP $AP_i$ 210-$i$. If UE 100 is stationary, the relative and absolute speed and the relative and absolute direction of movement may be the same.

In block 535, a probability $p_{APi}$ that AP $AP_i$ 210-$i$ is mobile may be determined based on one or more of: (a) a comparison of expected Doppler frequency $F_{D2}^{e}$ to the actual Doppler frequency measurements at band $F_2$ or (b) a measure of correlation between expected Doppler frequency $F_{D2}^{e}$ and Doppler frequency measurements at band $F_2$; or (c) a degree to which Doppler frequency measurements at band $F_2$ differ from the expected Doppler frequency $F_{D2}^{e}$. In some embodiments, Doppler frequency measurements at two (or more) frequency bands may help mitigate errors caused by local oscillator biases and/or frequency drift. In some embodiments, a value between 0 and 1 ($0 \leq p_{APi} \leq 1$) may be assigned to $p_{APi}$. Control may then return to method 500 (FIG. 5A).

Referring to FIG. 5A, in block 550, in some embodiments, it may be determined if $p_{APi}$ does not exceed some threshold likelihood of mobility (th$_L$). If $p_{APi}$ does not exceed th$_L$ ("Y" in block 550), then, in block 560, information pertaining to $AP_i$ 210-$i$ may be reported (e.g. by UE 100 to server 250). For example, the information may include identifying information for $AP_i$ 210-$i$, location information for $AP_i$ 210-$i$ (if available, e.g. based on wireless measurements by UE 100), location information for UE 100 at the time of the measurements (e.g. if available to UE 100 based on input from SPS receiver 140, VBP, and/or a VNS). In some embodiments, the identifying information for $AP_i$ 210-$i$ may include one or more of: a Medium Access Control (MAC) address associated with $AP_i$ 210-$i$, Basic Service Set Identification (BSSID), Service Set Identification (SSID), a base station identifier, and/or another network identifier. The identifying information may uniquely identify AP 210-$i$.

If $p_{APi}$ exceeds th$_L$ ("N" in block 550), then, in some embodiments, block 570 may optionally be performed. In some embodiments, block 570 may be omitted, and block 580 may be invoked. When block 570 is performed, then, in block 570, identifying information pertaining to mobile $AP_i$ 210-$i$ may be reported (e.g. by UE 100 to server 250), In some embodiments, mobility indication information (e.g. an estimated speed, direction of travel of $AP_i$ 210-$i$, etc., if available) may be reported (e.g. by UE 100 to server 250). In some embodiments, a server 250 receiving information about a mobile AP may delete the AP from database 252 and/or update a record associated with the AP to indicate that it is mobile and/or unsuitable for location determination).

In block 580, if there are additional APs, then in block 515, the counter i is incremented and the next AP is processed in the subsequent iteration, otherwise, control may be returned to the calling routine.

Figure 6:
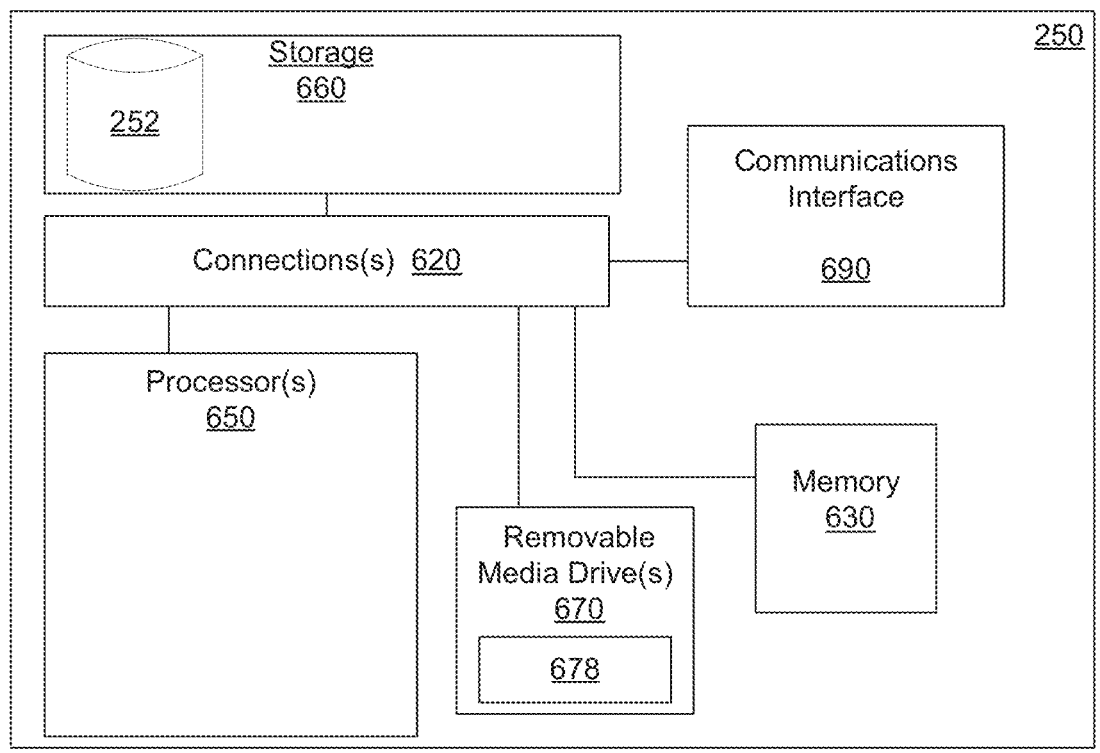
FIG. 6 shows a schematic block diagram illustrating a server enabled to aggregate AP information and provide location assistance information in an environment that includes mobile APs and UEs.

FIG. 6 shows a schematic block diagram illustrating a server 250 enable to aggregate AP information and provide location assistance information in an environment that includes mobile APs and UEs. In some embodiments, server 250 may be cloud-based.

In some embodiments, the information aggregated by server 250, for example, in exemplary database 252 (e.g. a location assistance database), may be created, updated and/or maintained by one or more of: (a) crowdsourcing (e.g. based on information from UEs 100), or (b) configured by a network operator (e.g. at installation), or (c) configured by a network entity. For example, the information may be provided by one or more of APs 210, UEs 100 and/or other devices coupled to server 250 over network 230 and/or network 130. In some embodiments, server 250 may communicate with UE s 100 and/or other network entities to provide information stored in databases 252 (e.g. to indicate that an AP 210 is mobile).

In some embodiments, server 250 may include, for example, one or more processors 650, memory 630, storage 660, and (as applicable) communications interface 690 (e.g., wireline or wireless network interface), which may be operatively coupled with one or more connections 620 (e.g., buses, lines, fibers, links, etc.). In certain example implementations, some portion of server 250 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may also include interfaces for communication with various other computers and peripherals. For example, in one embodiment, communications interface 690 may comprise network interface cards, input-output cards, integrated circuits, and/or ASICs that implement one or more of the communication functions performed by server 250. In some embodiments, communications interface 690 may interface with UEs 100 and other entities over networks 230 (not shown in FIG. 6) to obtain a variety of network configuration related information, such as MAC addresses (e.g. of APs) SSIDs, BSSIDs, Base Station Identifiers, Physical Cell Identities, (PCIs), device and network identifiers (e.g. of UEs 100 and/or APs 210 coupled to networks 230). In some embodiments, communications interface 690 may make use of the LPP annex (LPPa) protocol defined in 3GPP TS 36.455 or a modification of this protocol to obtain PCI, configured PRS, timing and/or other information from the base stations in network 230. Processor(s) 650 may use some or all of the received information to generate OTDOA and other location assistance data information in a manner consistent with disclosed embodiments.

In some embodiments, the information pertaining to APs 210 may be stored in database 252. In some embodiments, a portion of the information in database 252 may be crowd-sourced (e.g. from UEs 100). In some embodiments, database 252 may be a location assistance database and information in the location assistance database may be provided to UEs 100 to help location determination. For example, database 252 may include location and identifying information for one or more APs 210 (e.g. stationary APs 210), which may be provided to UEs 100. UE 100 and/or server 250 may use wireless measurements from APs 210 (e.g. obtained and/or provided by UE 100) in conjunction with the locations of APs 210 (e.g. provided by server 250 from databases 252) to determine its location. In some embodiments, a record for an AP 210-$i$ in database 252 may include an identifier for the AP 210-$i$, a location of the AP 210-$i$, a probability $p_{APi}$ that AP $AP_i$ 210-$i$ is mobile. In some embodiments, APs 210-$i$ that are determined to be stationary and/or associated with a low probability of mobility may be stored in database 252. In some embodiments, APs 210-$i$ that are determined to be mobile and/or associated with a high probability of mobility may be: (i) deleted from database 252, or (ii) include mobility indication information for AP 210-$i$. In some embodiments, the probability $p_{APi}$ that AP $AP_i$ 210-$i$ is mobile may be used to obtain a corresponding weight, which may be used (e.g. by UE 100 and/or server 250) when determining a location of UE 100. In some embodiments, the weight may be inversely proportional to the probability of mobility so that a higher weight may be accorded to APs that are stationary or perceived as likely to be stationary (e.g. a low probability of mobility).

Processor(s) 650 may be implemented using a combination of hardware, firmware, and software. Processor(s) 650 may use received AP measurements and other information (e.g. provided by UEs 100 and/or other entities communicatively coupled to server 250) to derive location assistance information. For example, processor(s) 650 may obtain location assistance information from the information provided by UEs 100 for AP 210. The information provided by UE 100 and/or received by server 250 may include: AP identification information, AP and/or UE location information (if available), AP mobility indication information including a probability that an AP 210 is mobile, etc. In some embodiments, mobile APs including APs detected over V2V communication systems may not be reported to server 250 by UE 100.

In some embodiments, server 250/processor(s) 650 may aggregate the received mobility indication information for APs 210 to update location assistance information in database 252. For example, aggregated information may indicate that an AP 210 previously considered as stationary may now be considered mobile (or vice versa). Accordingly, in some embodiments, data associated with the now mobile AP may be deleted from database 252 or the database may be updated to reflect the changed status of the AP. Server 250 may also use statistical methods to update the probability that an AP 210 is mobile based on newly received information (e.g. provided by a UE) related to one or more APs 210 prior to storing the information in database 252. In some embodiments, server 250 may provide some of the information in database 252 in response to a location assistance request received from UEs 100. For example, server may select APs 210 that are likely to be stationary when providing the location assistance information. As another example, server 250 may provide the probabilities of mobility of APs when providing AP related information. In some embodiments, as outlined previously, the probabilities may be used to weight measurements by UE 100, when determining its location.

The elements and methodologies described herein in may be implemented by various means depending upon the application. For example, these elements and methodologies may be implemented in hardware, firmware, software, or any combination thereof. For a hardware implementation, the processor(s) 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using procedures, functions, and so on that perform the techniques described herein. Any machine-readable medium tangibly embodying instructions may be used in implementing the methodologies described herein. For example, software may be stored in removable media drive 670, which may support the use of computer-readable media 678, including removable media. Program code may be resident on computer readable media 678 or memory 630 and may be read and executed by processors 650. Memory 630 may be implemented within processors 650 or external to the processors 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium 678 and/or memory 630. Examples include computer-readable media encoded with a data structure and computer-readable media encoded with a computer program. For example, computer-readable medium 678 including program code stored thereon may include program code to support proxy device usage in a manner consistent with disclosed embodiments.

Computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on a computer-readable medium, instructions and/or data may be provided as signals on transmission media to communications interface 690, which may store the instructions/data in memory 630, storage 660, and/or relay the instructions/data to processors 650 for execution. For example, communications interface 690 may receive wireless or network signals indicative of instructions and data. The instructions and data may configure one or more processors to implement the functions outlined in the claims. That is, the communication apparatus includes transmission media with signals indicative of information to perform disclosed functions.

Memory 630 may represent any data storage mechanism. Memory 630 may include, for example, a primary memory and/or a secondary memory. Primary memory may include, for example, a random access memory, read only memory, nonvolatile RAM, etc. While illustrated in this example as being separate from processors 650, it should be understood that all or part of a primary memory may be provided within or otherwise co-located/coupled with processor(s) 650. Secondary memory may include, for example, the same or similar type of memory as primary memory and/or storage 660 such as one or more data storage devices including, for example, hard disk drives, optical disc drives, tape drives, a solid state memory drive, etc. In some embodiments, storage 660 may comprise one or more databases that may hold information pertaining to various entities in system 200 and/or the broader cellular network. In some embodiments, information in the databases may be read, used, and/or updated by processors 650 during various computations, including storing, updating, and/or generating location assistance data, etc.

In certain implementations, secondary memory may be operatively receptive of, or otherwise configurable to couple to a computer-readable medium 678. As such, in certain example implementations, the methods and/or apparatuses presented herein may take the form in whole or part of a removable media drive 670 that may include computer-readable medium 678 with computer implementable instructions stored thereon, which if executed by processors 650 may be operatively enabled to perform all or portions of the example operations including methods 300, 400, and/or 500 in a manner consistent with embodiments described herein. Computer-readable medium 678 may be a part of memory 630.

Figure 7:
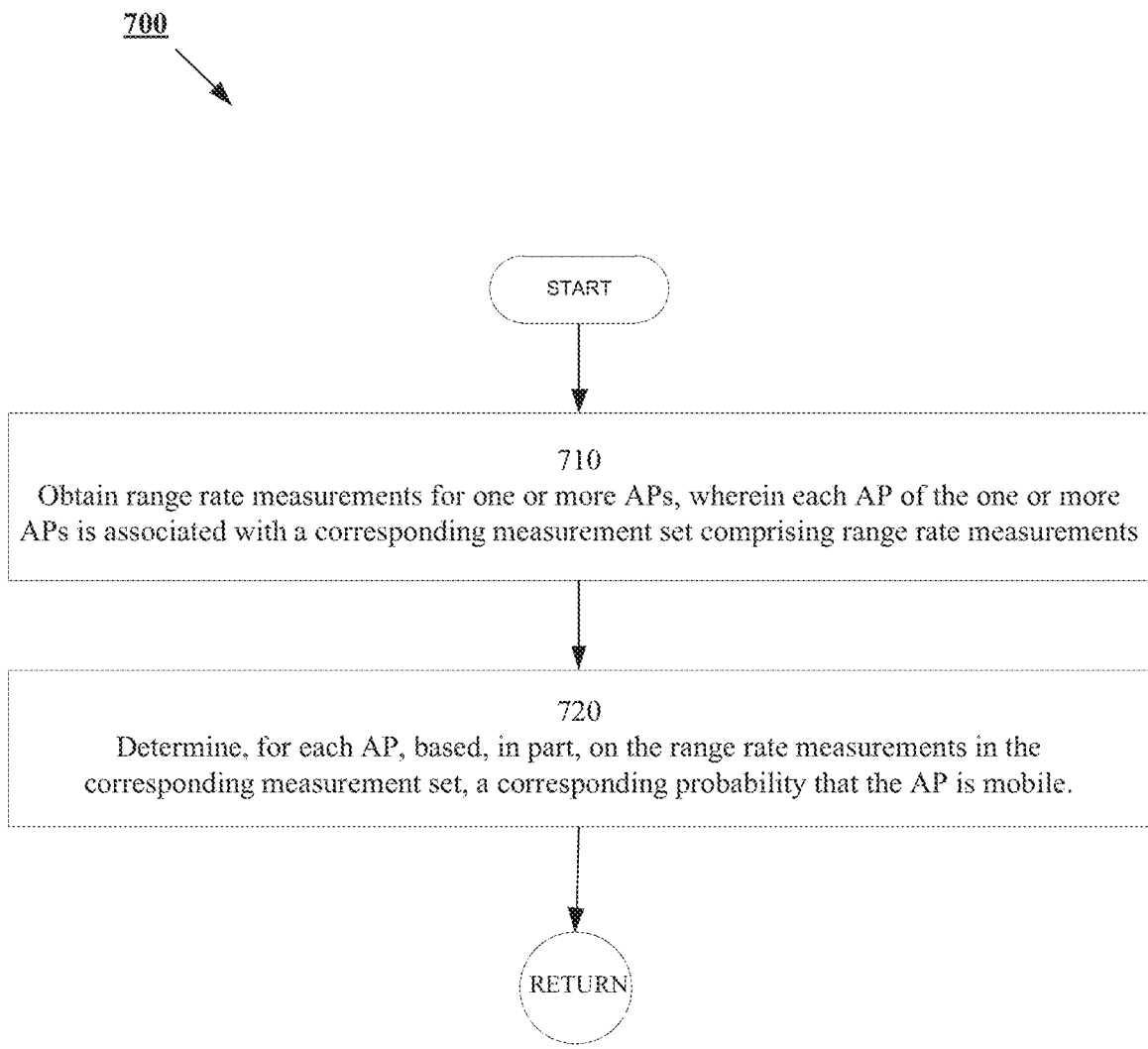
FIG. 7 shows a flowchart of an exemplary method for AP mobility determination.

FIG. 7 shows a flowchart of an exemplary method 700 for AP mobility determination. In some instances, method 700 may be implemented on an UE 100/processor(s) 150. In some embodiments, UE 100/processor(s) 150 may use measurements by transceiver 110 to determine the mobility of one or more APs 210. In some embodiments, one or more of SPS Receiver 140, camera(s) 180, sensor(s) 185, and/or IMU 170 may also be used to facilitate detection of mobile APs and/or to provide information to facilitate AP mobility determination.

In some embodiments, measurements of wireless signals (e.g. WWAN, WLAN, and/or WPAN) received by transceiver 110/receiver 114 may also be used to determine AP mobility. In some embodiments, the determination of AP mobility may occur based on measurements of wireless signals in conjunction with available measurements from one or more of: SPS Receiver 140, camera(s) 180, sensor(s) 185 (e.g. altimeter, barometer etc.), and/or IMU 170. For example, measurements from one or more of: SPS Receiver 140, camera(s) 180, sensor(s) 185 (e.g. altimeter, barometer etc.), and/or IMU 170 may be used to determine a speed and/or a direction of travel of UE 100. In some embodiments, sensor measurements may be obtained concurrently with the performance of method 700.

In block 710, range rate measurements for one or more APs 210 may be obtained, where each AP (e.g. $AP_i$ 210-$i$) of the one or more APs 210 may be associated with a corresponding measurement set, which may comprise range rate measurements. In some embodiments, range rate measurements may be determined for the one or more APs 210 that are not in communication with the UE over a Vehicle-to-Vehicle (V2V) communication system, such as a V2V communication system based on Dedicated Short Range Communications (DSRC). In some embodiments, the range rate measurements may be based on at least one of: corresponding Round Trip Time (RTT) measurements between the UE 100 and the for one or more APs 210, or corresponding Time Of Flight measurements between the UE and the for one or more APs 210, or corresponding Received Signal Strength Indication (RSSI) measurements for signals received by the UE from the for one or more APs 210.

In block 720, for each AP (e.g. $AP_i$ 210-$i$), a corresponding probability (e.g. $p_{APi}$) that the $AP_i$ 210-$i$ is mobile may be determined based, in part, on the range rate measurements in the corresponding measurement set. In some embodiments, for each AP (e.g. $AP_i$ 210-$i$), the corresponding probability (e.g. $p_{APi}$) that the $AP_i$ 210-$i$ is mobile may determined by: determining a corresponding expected range rate value for each range rate measurement associated with the $AP_i$ 210-$i$, where the corresponding expected range rate value may be determined based, in part, on a speed of the UE 100 at a time of the corresponding range rate measurement. The corresponding probability $p_{APi}$ that the $AP_i$ 210-$i$ is mobile may then be determined based on a comparison of the range rate measurements with corresponding expected range rate values. In some embodiments, the speed of the UE 100 is determined based on one or more of: measurements from IMU 170; or measurements from SPS receiver 140; or input from a Vehicle Navigation System (VNS) communicatively coupled to the UE; or input from image sensor 180; or some combination thereof.

In some embodiments, the method may further comprise: determining a subset of the one or more APs 210, wherein for each AP (e.g. $AP_i$ 210-$i$) in the subset the corresponding probability (e.g. $p_{APi}$) that the $AP_i$ 210-$i$ is mobile is below a first threshold. Information related to APs 210 in the subset may be reported to a server (e.g. server 250), which may take the form of a location server.

In some embodiments, for each AP (e.g. $AP_i$ 210-$i$), the range rate measurements may be based on corresponding Round Trip Time (RTT) measurements between the UE 100 and the $AP_i$ 210-$i$; and, the corresponding probability (e.g. $p_{APi}$) that the $AP_i$ 210-$i$ is mobile may be determined based, in part, on the corresponding RTT measurements. Further, in some embodiments, for each $AP_i$ 210-$i$, corresponding Doppler frequency measurements associated with a nominal frequency band used by the $AP_i$ 210-$i$ for transmissions may be obtained; and, the corresponding probability $p_{APi}$ that the $AP_i$ 210-$i$ is mobile may be updated based, in part, on the corresponding Doppler frequency measurements.

In some embodiments, for each AP (e.g. $AP_i$ 210-$i$), the range rate measurements in the corresponding measurement set may comprise corresponding first Doppler frequency measurements associated with a first nominal frequency band used by the $AP_i$ 210-$i$ for transmissions; and, the corresponding probability $p_{APi}$ that the $AP_i$ 210-$i$ is mobile may be determined based, in part, on the corresponding first Doppler frequency measurements. In some embodiments, determining, for each AP (e.g. $AP_i$ 210-$i$), the corresponding probability that the $AP_i$ 210-$i$ is mobile may comprise determining, corresponding to each first Doppler frequency measurement, a corresponding first expected Doppler frequency value. The corresponding first expected Doppler frequency value may be determined based, in part, on a speed of the UE 100 at time of the first Doppler frequency measurement. The corresponding probability $p_{APi}$ that the $AP_i$ 210-$i$ is mobile may then be determined based on a comparison of the first Doppler frequency measurements and the corresponding first expected Doppler frequency values.

Further, in some embodiments, for each AP (e.g. $AP_i$ 210-$i$), a second expected Doppler frequency value may be determined based, in part, on the corresponding first Doppler frequency measurement, and for each AP $AP_i$ 210-$i$, one or more corresponding second Doppler frequency measurements associated with a second nominal frequency band used by $AP_i$ 210-$i$ for transmission may be obtained, where the second nominal frequency band is different from the first nominal frequency band. The corresponding probability that $AP_i$ 210-$i$ is mobile may then be updated based, in part, on a comparison of the one or more corresponding second Doppler frequency measurements and the corresponding second expected Doppler frequency value.

Figure 8:
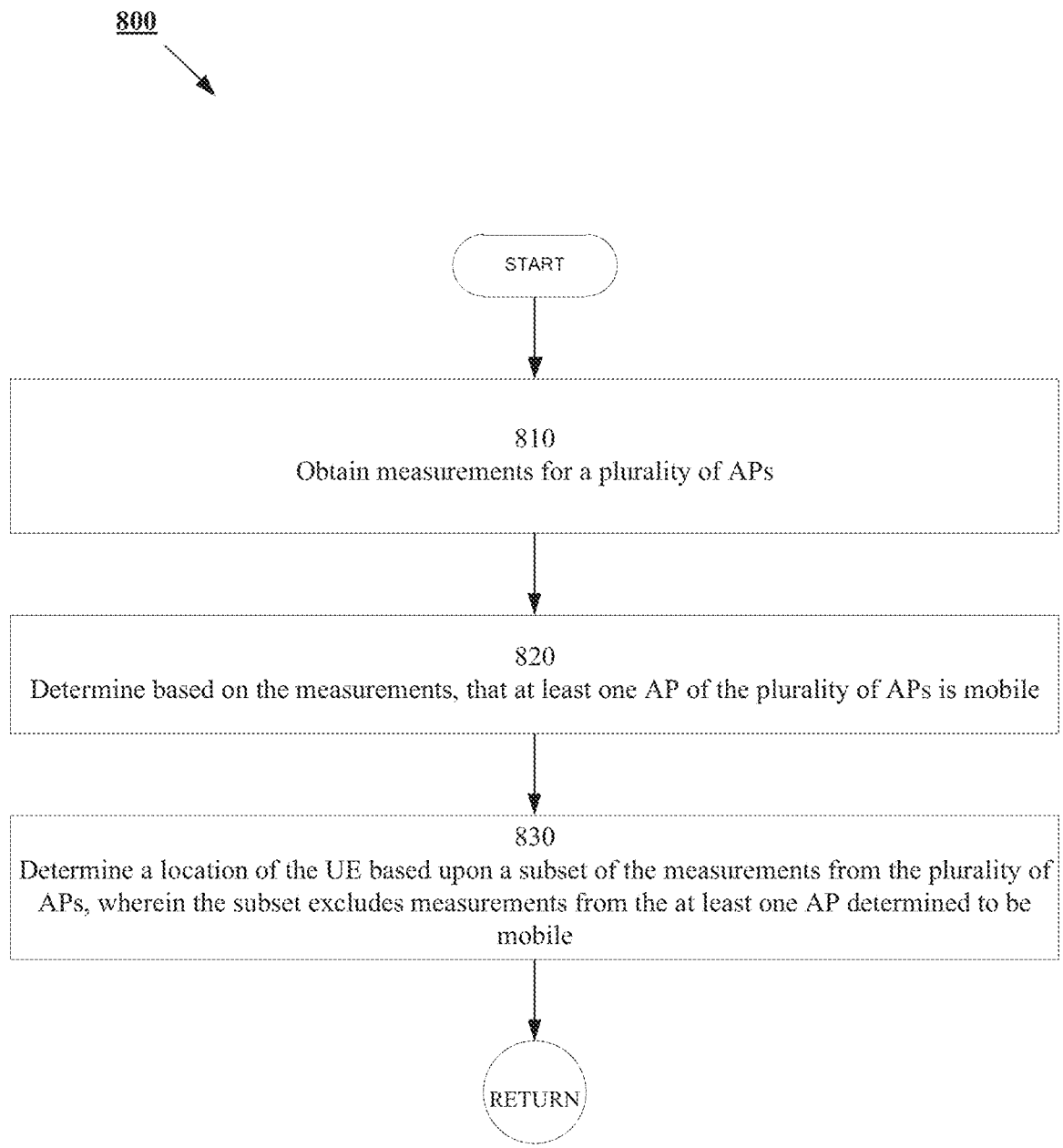
FIG. 8 shows a flowchart of an exemplary method for UE location determination.

FIG. 8 shows a flowchart of an exemplary method 800 for UE location determination. In some instances, method 800 may be implemented on an UE 100/processor(s) 150.

In some embodiments, UE 100/processor(s) 150 may use measurements by transceiver 110 to determine the location of UE. In some embodiments, one or more of SPS Receiver 140, camera(s) 180, sensor(s) 185, and/or IMU 170 may also be used to facilitate detection of mobile APs 210 and/or to provide information to facilitate AP mobility determination. In some embodiments, the determination of AP mobility may occur based on measurements of wireless signals in conjunction with available measurements from one or more of: SPS Receiver 140, camera(s) 180, sensor(s) 185 (e.g. altimeter, barometer etc.), and/or IMU 170. For example, measurements from one or more of: SPS Receiver 140, camera(s) 180, sensor(s) 185 (e.g. altimeter, barometer etc.), and/or IMU 170 may be used to determine a speed and/or a direction of travel of UE 100. In some embodiments, sensor measurements may be obtained concurrently with the performance of method 800.

In block 810, measurements from a plurality of APs 210 may be obtained. In some embodiments, the measurements may comprise: RTT measurements, or Time Of Flight measurements, or RSSI measurements, or Doppler frequency measurements, or some combination thereof. For example, UE 100 may obtain measurements (e.g. RTT, RSSI, Doppler frequency measurements) of wireless signals (e.g. WWAN, WLAN and/or WPAN) received by transceiver 110/receiver 114.

In some embodiments, the measurements from the plurality of APs 210 may comprise: range rate measurements for the plurality of APs 210, wherein each AP (e.g. $AP_i$ 210-$i$) of the plurality of APs 210 is associated with a corresponding measurement set comprising range rate measurements associated with the AP $AP_i$ 210-$i$.

In block 820, based on the measurements, UE 100 may determine that at least one AP (e.g. $AP_j$ 210-$j$) of the plurality of APs is mobile.

In some embodiments, for each AP: range rate measurements in the corresponding measurement set may be based on corresponding Round Trip Time (RTT) measurements between the UE and the AP. The UE may further determine, based, in part, on corresponding RTT measurements associated with the at least one AP (e.g. $AP_j$ 210-$j$), a corresponding probability $p_{APj}$ associated with the at least one AP $AP_j$ 210-$j$ determined to be mobile.

In some embodiments, the range rate measurements in the corresponding measurement set may comprise corresponding first Doppler frequency measurements associated with a first nominal frequency band used by the APs 210 for transmissions. UE 100 may further determine based, in part, on corresponding first Doppler frequency measurements associated with the at least one AP (e.g. $AP_j$ 210-$j$), a corresponding probability $p_{APj}$ that the at least one AP $AP_j$ 210-$j$ is mobile.

In block 830, a location of the UE 100 based upon a subset of the measurements from the plurality of APs 210, wherein the subset excludes measurements from the at least one AP (e.g. $AP_j$ 210-$j$) determined to be mobile.

In some embodiments, following determination of a corresponding probability (e.g. $p_{APj}$) associated with the at least one AP (e.g. $AP_j$ 210-$j$) determined to be mobile (e.g. based on RTT measurements), method 800 may further comprise obtaining corresponding Doppler frequency measurements associated with a nominal frequency band used by the at least one AP $AP_j$ 210-$j$ for transmissions. Further, the corresponding probability $p_{APj}$ that the at least one AP $AP_j$ 210-$j$ is mobile may be updated based, in part, on the corresponding Doppler frequency measurements.

In some embodiments, following determination of a corresponding probability $p_{APj}$ associated with the at least one AP $AP_j$ 210-$j$ determined to be mobile (e.g. based on first Doppler frequency measurements), method 800 may further comprise obtaining corresponding second Doppler frequency measurements associated with a second nominal frequency band used by the at least one AP for transmissions. Further, the corresponding probability $p_{APj}$ that the at least one AP $AP_j$ 210-$j$ is mobile may be updated based, in part, on the corresponding second Doppler frequency measurements.

In some embodiments, to determine that at least one AP (e.g. $AP_j$ 210-$j$) of the plurality of APs 210 is mobile, UE 100 may determine, for each range rate measurement associated with the at least one AP $AP_j$ 210-$j$, a corresponding expected range rate value, wherein the corresponding expected range rate value is based, in part, on a speed of UE 100 at a time of the corresponding range rate measurement. UE 100 may then determine that the at least one AP $AP_j$ 210-$j$ is mobile based on a comparison of the range rate measurements associated with the at least one AP $AP_j$ 210-$j$ with the corresponding expected range rate values for the at least one AP $AP_j$ 210-$j$. In some embodiments, the speed of the UE 100 may be determined based on one or more of: measurements from IMU 170; or measurements from an SPS (e.g. obtained by SPS receiver 140); or input from a Vehicle Navigation System (VNS) communicatively coupled to UE 100; or input from image sensor 180; or some combination thereof.

In some embodiments, to determine that the at least one AP (e.g. $AP_j$ 210-$j$) is mobile, UE 100 may determine that the at least one AP $AP_j$ 210-$j$ is in communication with the UE over a Vehicle-to-Vehicle (V2V) communication system. For example, the V2V communication system may be based on Dedicated Short Range Communications (DSRC).

In some embodiments, method 800 may further comprise reporting information related to the at least one AP $AP_j$ 210-$j$ to server 250. In some embodiments, server 250 may be location server.

Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A method on a User Equipment (UE) comprising:
obtaining measurements from a plurality of Access Points (APs), wherein each AP of the plurality of APs is associated with a corresponding measurement set comprising range rate measurements, wherein the range rate measurements in the corresponding measurement set are based on corresponding Round Trip Time (RTT) measurements between the UE and the AP;
determining, based at least in part, on the corresponding RTT measurements, a corresponding probability that at least one AP of the plurality of APs is mobile; and
determining a location of the UE based upon a subset of the measurements from the plurality of APs, wherein, in response to a determination that the corresponding probability that the at least one AP is mobile exceeds a threshold, the subset excludes measurements from the at least one AP determined to be mobile.

2. The method of claim 1, further comprising:
obtaining corresponding Doppler frequency measurements associated with a nominal frequency band used by the at least one AP for transmissions; and,
updating the corresponding probability that the at least one AP is mobile based, in part, on the corresponding Doppler frequency measurements.

3. The method of claim 1, wherein determining the corresponding probability that the at least one AP is mobile comprises:
determining, for each range rate measurement associated with the at least one AP, a corresponding expected range rate value, wherein the corresponding expected range rate value is based, in part, on a speed of the UE at a time of the corresponding range rate measurement; and
determining the corresponding probability that the at least one AP is mobile based on a comparison of the range rate measurements associated with the at least one AP with the corresponding expected range rate value for the at least one AP.

4. The method of claim 3, wherein the speed of the UE is determined based on one or more of:
measurements from an Inertial Measurement Unit (IMU); or
measurements from a Satellite Positioning System (SPS); or
input from a Vehicle Navigation System (VNS) communicatively coupled to the UE; or
input from an image sensor; or
some combination thereof.

5. The method of claim 1, wherein, for each AP of the plurality of APs:
the range rate measurements in the corresponding measurement set comprise corresponding first Doppler frequency measurements associated with a first nominal frequency band used by the AP for transmissions; and, wherein,
determining the corresponding probability that the at least one AP is mobile comprises:
determining, based, in part, on the corresponding first Doppler frequency measurements associated with the at least one AP, the corresponding probability that the at least one AP is mobile.

6. The method of claim 5, further comprising:
obtaining corresponding second Doppler frequency measurements associated with a second nominal frequency band used by the at least one AP for transmissions; and,
updating the corresponding probability that the at least one AP is mobile based, in part, on the corresponding second Doppler frequency measurements.

7. The method of claim 1, wherein determining the corresponding probability that the at least one AP is mobile comprises:
determining that the at least one AP is in communication with the UE over a Vehicle-to-Vehicle (V2V) communication system.

8. The method of claim 7, wherein the V2V communication system is based on Dedicated Short Range Communications (DSRC).

9. The method of claim 1, further comprising:
reporting information related to the at least one AP to a server.

10. The method of claim 9, wherein the server is a location server.

11. The method of claim 1, wherein the measurements comprise:
Round Trip Time (RTT) measurements, or
Time Of Flight measurements, or
Received Signal Strength Indication (RSSI) measurements, or
Doppler frequency measurements, or
some combination thereof.

12. A User Equipment (UE) comprising:
a memory;
a transceiver; and
a processor coupled to the memory and the transceiver, wherein the processor is configured to:
obtain, using the transceiver, measurements from a plurality of Access Points (APs), wherein each AP of the plurality of APs is associated with a corresponding measurement set comprising range rate measurements, wherein the range rate measurements in the corresponding measurement set are based on corresponding Round Trip Time (RTT) measurements between the UE and the AP;
determine, based at least in part, on the corresponding RTT measurements, a corresponding probability that at least one AP of the plurality of APs is mobile; and
determine a location of the UE based upon a subset of the measurements from the plurality of APs, wherein in response to a determination that the corresponding probability that the at least one AP is mobile exceeds a threshold, the subset excludes measurements from the at least one AP determined to be mobile.

13. The UE of claim 12, wherein the processor is further configured to:
obtain corresponding Doppler frequency measurements associated with a nominal frequency band used by the at least one AP for transmissions; and,
update the corresponding probability that the at least one AP is mobile based, in part, on the corresponding Doppler frequency measurements.

14. The UE of claim 12, wherein to determine the corresponding probability that the at least one AP is mobile, the processor is configured to:
determine, for each range rate measurement associated with the at least one AP, a corresponding expected range rate value, wherein the corresponding expected range rate value is based, in part, on a speed of the UE at a time of the corresponding range rate measurement; and determine the corresponding probability that the at least one AP is mobile based on a comparison of the range rate measurements associated with the at least one AP with the corresponding expected range rate value for the at least one AP.

15. The UE of claim 14, wherein the speed of the UE is determined based on one or more of:
measurements from an Inertial Measurement Unit (IMU) sensor on the UE; or
measurements from a Satellite Positioning System (SPS); or
input from a Vehicle Navigation System (VNS) communicatively coupled to the UE; or
input from an image sensor on the UE; or
some combination thereof.

16. The UE of claim 12, wherein, for each AP of the plurality of APs:
the range rate measurements in the corresponding measurement set comprise corresponding first Doppler frequency measurements associated with a first nominal frequency band used by the AP for transmissions; and, wherein,
to determine the corresponding probability that the at least one AP is mobile, the processor is configured to:
determine, based, in part, on the corresponding first Doppler frequency measurements associated with the at least one AP, the corresponding probability that the at least one AP is mobile.

17. The UE of claim 16, wherein the processor is further configured to:
obtain corresponding second Doppler frequency measurements associated with a second nominal frequency band used by the at least one AP for transmissions; and,
update the corresponding probability that the at least one AP is mobile based, in part, on the corresponding second Doppler frequency measurements.

18. The UE of claim 12, wherein to determine the corresponding probability that the at least one AP is mobile, the processor is configured to:
determine that the at least one AP is in communication with the UE over a Vehicle-to-Vehicle (V2V) communication system.

19. The UE of claim 18, wherein the V2V communication system is based on Dedicated Short Range Communications (DSRC).

20. The UE of claim 12, wherein the processor is further configured to:
report, using the transceiver, information related to the at least one AP to a server.

21. A User Equipment (UE) comprising:
means for obtaining measurements from a plurality of Access Points (APs), wherein each AP of the plurality of APs is associated with a corresponding measurement set comprising range rate measurements, wherein the range rate measurements in the corresponding measurement set are based on corresponding Round Trip Time (RTT) measurements between the UE and the AP;
means for determining, based at least in part, on the corresponding RTT measurements, a corresponding probability that at least one AP of the plurality of APs is mobile; and
means for determining a location of the UE based upon a subset of the measurements from the plurality of APs, wherein in response to a determination that the corresponding probability that the at least one AP is mobile exceeds a threshold, the subset excludes measurements from the at least one AP determined to be mobile.

22. A non-transitory computer-readable medium comprising executable instructions to configure a processor on a User Equipment (UE) to:
obtain measurements from a plurality of Access Points (APs), wherein each AP of the plurality of APs is associated with a corresponding measurement set comprising range rate measurements, wherein the range rate measurements in the corresponding measurement set are based on corresponding Round Trip Time (RTT) measurements between the UE and the AP;
determine, based at least in part, on the corresponding RTT measurements, a corresponding probability that at least one AP of the plurality of APs is mobile; and
determine a location of the UE based upon a subset of the measurements from the plurality of APs, wherein in response to a determination that the corresponding probability that the at least one AP is mobile exceeds a threshold, the subset excludes measurements from the at least one AP determined to be mobile.

* * * * *